US012741467B2

(12) United States Patent
Ono

(10) Patent No.: US 12,741,467 B2
(45) Date of Patent: Sep. 22, 2026

(54) MAINTENANCE METHOD AND IMAGE RECORDING DEVICE

(71) Applicant: BROTHER KOGYO KABUSHIKI KAISHA, Nagoya (JP)

(72) Inventor: Katsuya Ono, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 93 days.

(21) Appl. No.: 18/746,426

(22) Filed: Jun. 18, 2024

(65) Prior Publication Data

US 2024/0424797 A1 Dec. 26, 2024

(30) Foreign Application Priority Data

Jun. 20, 2023 (JP) ................................ 2023-100809

(51) Int. Cl.
*B41J 2/165* (2006.01)
*C09D 9/04* (2006.01)

(52) U.S. Cl.
CPC ............ *B41J 2/16552* (2013.01); *C09D 9/04* (2013.01); *B41J 2002/16558* (2013.01); *B41J 2002/16564* (2013.01)

(58) Field of Classification Search
CPC B41J 2/16535; B41J 2/16538; B41J 2/16541; B41J 2/16552; B41J 2002/16558; B41J 2002/16564; C09D 9/04; C09K 23/38; C09K 23/42; C09K 23/54
See application file for complete search history.

(56) References Cited

U.S. PATENT DOCUMENTS

2013/0257975 A1* 10/2013 Aoyama ............. B41J 2/16526 347/28
2016/0311225 A1 10/2016 Hara et al.

FOREIGN PATENT DOCUMENTS

| | | | |
|---|---|---|---|
| JP | H11198396 | A | 7/1999 |
| JP | 2000328093 | A | 11/2000 |
| JP | 2005059326 | A | 3/2005 |
| JP | 2011093216 | A | 5/2011 |
| JP | 2014151624 | A | 8/2014 |
| JP | 2020093501 | A | 6/2020 |
| JP | 2020175631 | A | 10/2020 |

OTHER PUBLICATIONS

Extended European Search Report issued Oct. 30, 2024, in corresponding European Patent Application No. 24181809.5, 6 pages.

* cited by examiner

*Primary Examiner* — Douglas Lee
(74) *Attorney, Agent, or Firm* — Element IP, PLC

(57) ABSTRACT

A maintenance method includes: supplying a cleaning liquid containing a surfactant to a predetermined portion of an inkjet printer; and supplying a liquid containing a defoaming agent to the predetermined portion to which the cleaning liquid is supplied. The liquid has a ratio of a defoaming distance to a foaming distance of 4.41% or more. The foaming distance is a first height of bubbles generated when the cleaning liquid is stirred by a stirrer for 1 minute, the cleaning liquid being put into a bottle having an inner diameter of 38 mm and a capacity of 50 ml so as to have a height of 20 mm. The defoaming distance is a value obtained by subtracting, from the first height of the bubbles, a second height of bubbles after 1 ml of the liquid is dropped into the bottle after the bubbles are generated.

14 Claims, 12 Drawing Sheets

UPPER
LOWER
FRONT
REAR
7
8
26
31F
31U
27
28
25
100
145
147
146
3
39
46B
46
40
29
38
49
36
31A
15
45A
31B
8A
51A
109A
31
30
32
33
43 (43A)
46A
46B
80
51
45
42
32F
52
32A
32B
70
114
111
34
32C
32D
110
112
41
37 (S)
35

38
43
50
48
38A
38A
REAR
8
FRONT
49
RIGHT
LEFT
9

49
24
22
23
50
38A 113
184
188
185
190
181
186
189
191
193
183
22
24
49
23
38A
50
62
67
21
20
60(61)
178
74
77
308
203
205
206
204
202
65
61B
180
201
179
78
192
64
61A
306
311
175
176
76
303
72
177
302
301
182
187
114
70
112
110
34

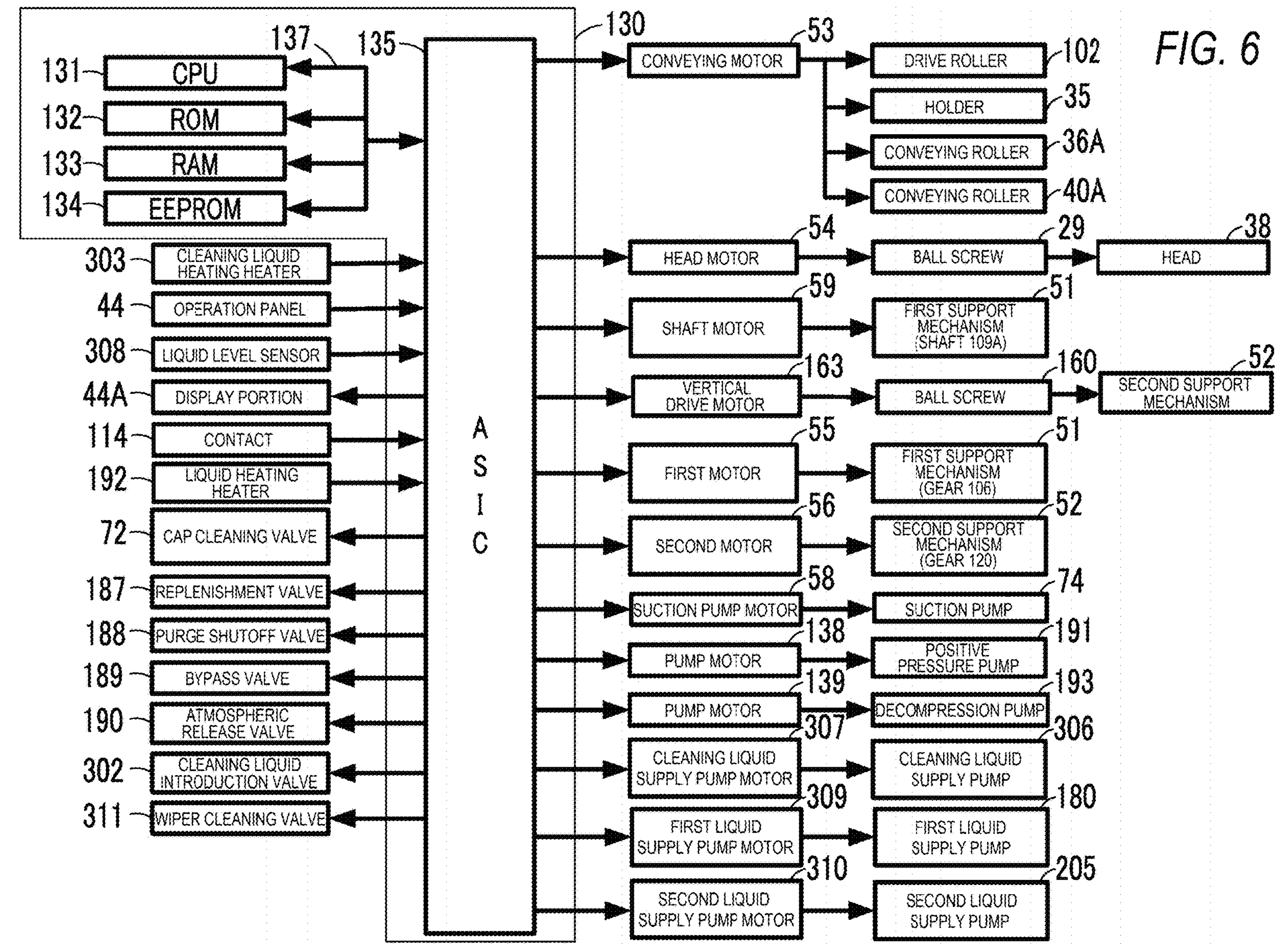
FIG. 6
130
135
137
131
CPU
132
ROM
133
RAM
134
EEPROM
A S I C
53
CONVEYING MOTOR
DRIVE ROLLER
102
HOLDER
35
CONVEYING ROLLER
36A
CONVEYING ROLLER
40A
54
HEAD MOTOR
29
BALL SCREW
38
HEAD
59
SHAFT MOTOR
51
FIRST SUPPORT MECHANISM (SHAFT 109A)
163
VERTICAL DRIVE MOTOR
160
BALL SCREW
52
SECOND SUPPORT MECHANISM
55
FIRST MOTOR
51
FIRST SUPPORT MECHANISM (GEAR 106)
56
SECOND MOTOR
52
SECOND SUPPORT MECHANISM (GEAR 120)
58
SUCTION PUMP MOTOR
74
SUCTION PUMP
138
PUMP MOTOR
191
POSITIVE PRESSURE PUMP
139
PUMP MOTOR
193
DECOMPRESSION PUMP
307
CLEANING LIQUID SUPPLY PUMP MOTOR
306
CLEANING LIQUID SUPPLY PUMP
309
FIRST LIQUID SUPPLY PUMP MOTOR
180
FIRST LIQUID SUPPLY PUMP
310
SECOND LIQUID SUPPLY PUMP MOTOR
205
SECOND LIQUID SUPPLY PUMP
303
CLEANING LIQUID HEATING HEATER
44
OPERATION PANEL
308
LIQUID LEVEL SENSOR
44A
DISPLAY PORTION
114
CONTACT
192
LIQUID HEATING HEATER
72
CAP CLEANING VALVE
187
REPLENISHMENT VALVE
188
PURGE SHUTOFF VALVE
189
BYPASS VALVE
190
ATMOSPHERIC RELEASE VALVE
302
CLEANING LIQUID INTRODUCTION VALVE
311
WIPER CLEANING VALVE 100
UPPER
LOWER
FRONT
REAR
7
8
30
31
32
15
31A
32B
32C
45A
42
35
36
36A
36B
38A
45
109A
29
29A
29B
48
38
64
63
D
102
101
104
62
154
49
106
105
103
41
4
108
51
51A
60
146
52
118
120
119
6
5
10
147
145
39
46
114
111
70
112
40
40A
40B
25
8A
43 (43A)
80
110
28
26
31F
27
33
32F
32A
34
37 (S)

100
UPPER
FRONT
REAR
LOWER 8
7
30
31
32
15
45A
32B
32C
42
31A
36
36A
36B
35
38A
D
109A
45
104
48
29
29A
29B
38
102
101
108
63
49
106
105
103
41
29(S)
4
38A
64
60
60A
62
51
51A
52
118
120
119
6
5
10
147
145
39
146
46
114
111
40
40A
40B
70
112
25
8A
43(43A)
80
110
28
26
31F
27
33
32F
32A
34

100
UPPER
LOWER 8
FRONT
REAR
7
30
31
32
15
45A
42
32B
32C
31A
36
36A
36B
35
38A
D
45
109A
104
102
38
48
29
29A
29B
63
101
154
37 (S)
49
38A
64
60
62
105
106
41
4
103
108
51A
51
52
118
120
119
6
5
147
146
145
39
10
114
111
46
40
40A
40B
70
112
25
43 (43A)
80
8A
110
28
26
31F
27
33
32F
32A
34

UPPER
REAR
LOWER
FRONT

MAINTENANCE METHOD AND IMAGE RECORDING DEVICE

REFERENCE TO RELATED APPLICATIONS

This application claims priority from Japanese Patent Application No. 2023-100809 filed on Jun. 20, 2023. The entire contents of these priority applications are incorporated herein by reference.

BACKGROUND ART

As a maintenance method for cleaning a predetermined portion of an inkjet printer with a cleaning liquid, for example, a maintenance method described in a related art is known. In the maintenance method of the related art, a discharge port surface is cleaned by supplying a cleaning liquid in a foamed state to the discharge port surface of a print head. Accordingly, solids such as ink adhered to the discharge port surface are dissolved by the cleaning liquid, and a discharge state of the liquid from a discharge port of the print head is made appropriate.

SUMMARY

In the maintenance method described above, bubbles of the cleaning liquid may enter the print head through the discharge port, for example. When the bubbles of the cleaning liquid enter the print head, discharge failure occurs. Therefore, it is considered to remove the bubbles of the cleaning liquid by supplying a liquid containing a defoaming agent to the discharge port surface after the discharge port surface is cleaned with the cleaning liquid. However, in order to reliably remove the bubbles of the cleaning liquid, for example, when a liquid containing a large amount of a defoaming agent is used, it is necessary to ensure a large space for storing the liquid, a time to supply the liquid to the discharge port surface is required, a waste liquid tank from which the liquid is ejected is immediately filled, and the liquid is likely to be left on the discharge port surface after wiping.

An object of the present disclosure is to provide a maintenance method capable of removing, even when bubbles of a cleaning liquid adhere to a predetermined portion of an inkjet printer, all the bubbles of the cleaning liquid from the predetermined portion with a small amount of liquid containing a defoaming agent, and an image recording device.

A maintenance method according to the present disclosure includes: supplying a cleaning liquid containing a surfactant to a predetermined portion of an inkjet printer; and supplying a liquid containing a defoaming agent to the predetermined portion to which the cleaning liquid is supplied. The liquid has a ratio of a defoaming distance to a foaming distance of 4.41% or more. The foaming distance is a first height of bubbles generated when the cleaning liquid is stirred by a stirrer for 1 minute, the cleaning liquid being put into a bottle having an inner diameter of 38 mm and a capacity of 50 ml so as to have a height of 20 mm. The defoaming distance is a value obtained by subtracting, from the first height of the bubbles, a second height of bubbles after 1 ml of the liquid is dropped into the bottle after the bubbles are generated.

In the supplying the cleaning liquid, even when the bubbles of the cleaning liquid containing the surfactant are generated in the predetermined portion of the inkjet printer, since the liquid containing the defoaming agent is supplied to the predetermined portion in the supplying the liquid, the defoaming agent comes into contact with the bubbles of the cleaning liquid, and thus the bubbles of the cleaning liquid are removed. Therefore, even when the bubbles of the cleaning liquid adhere to the predetermined portion of the inkjet printer, a failure caused by the bubbles of the cleaning liquid can be prevented. Since the liquid of which the ratio of the defoaming distance to the foaming distance is 4.41% or more is supplied to the predetermined portion, it is possible to remove all the bubbles of the cleaning liquid from the predetermined portion by using a small amount of the liquid.

An image recording device according to the present disclosure includes: a first wiper that is impregnated with a cleaning liquid containing a surfactant; a second wiper that is impregnated with a liquid containing a defoaming agent; a support body that supports the first wiper and the second wiper; a head including a nozzle surface on which a plurality of nozzles are opened; and a moving mechanism that causes the head and the support body to relatively move along a first direction. The second wiper is located upstream of the first wiper in a moving direction of the support body. The first wiper and the second wiper abut against the nozzle surface when the support body moves along the first direction. The liquid has a ratio of a defoaming distance to a foaming distance of 4.41% or more. The foaming distance is a first height of bubbles generated when the cleaning liquid is stirred by a stirrer for 1 minute, the cleaning liquid being put into a bottle having an inner diameter of 38 mm and a capacity of 50 ml so as to have a height of 20 mm. The defoaming distance is a value obtained by subtracting, from the first height of the bubbles, a second height of bubbles after 1 ml of the defoaming agent is dropped into the bottle after the bubbles are generated.

When the support body moves along the first direction, first, the first wiper that is impregnated with the cleaning liquid containing the surfactant abuts against the nozzle surface, so that a foreign matter adhering to the nozzle surface is easily removed. In this case, even when the bubbles of the cleaning liquid adhere to the nozzle surface, the second wiper that is impregnated with the liquid containing the defoaming agent subsequently abuts against the nozzle surface, so that the defoaming agent comes into contact with the bubbles of the cleaning liquid. Therefore, since the bubbles of the cleaning liquid are removed by the defoaming agent, the bubbles of the cleaning liquid are prevented from entering the plurality of nozzles. Since the liquid of which the ratio of the defoaming distance to the foaming distance is 4.41% or more is supplied to the nozzle surface, it is possible to remove all the bubbles of the cleaning liquid from the predetermined portion by using a small amount of the liquid.

According to the present disclosure, even when the bubbles of the cleaning liquid adhere to the predetermined portion of the inkjet printer, a failure caused by the bubbles of the cleaning liquid can be prevented.

BRIEF DESCRIPTION OF DRAWINGS

FIG. 6 is a block diagram of the image recording device 100.

DESCRIPTION

Figure 1:
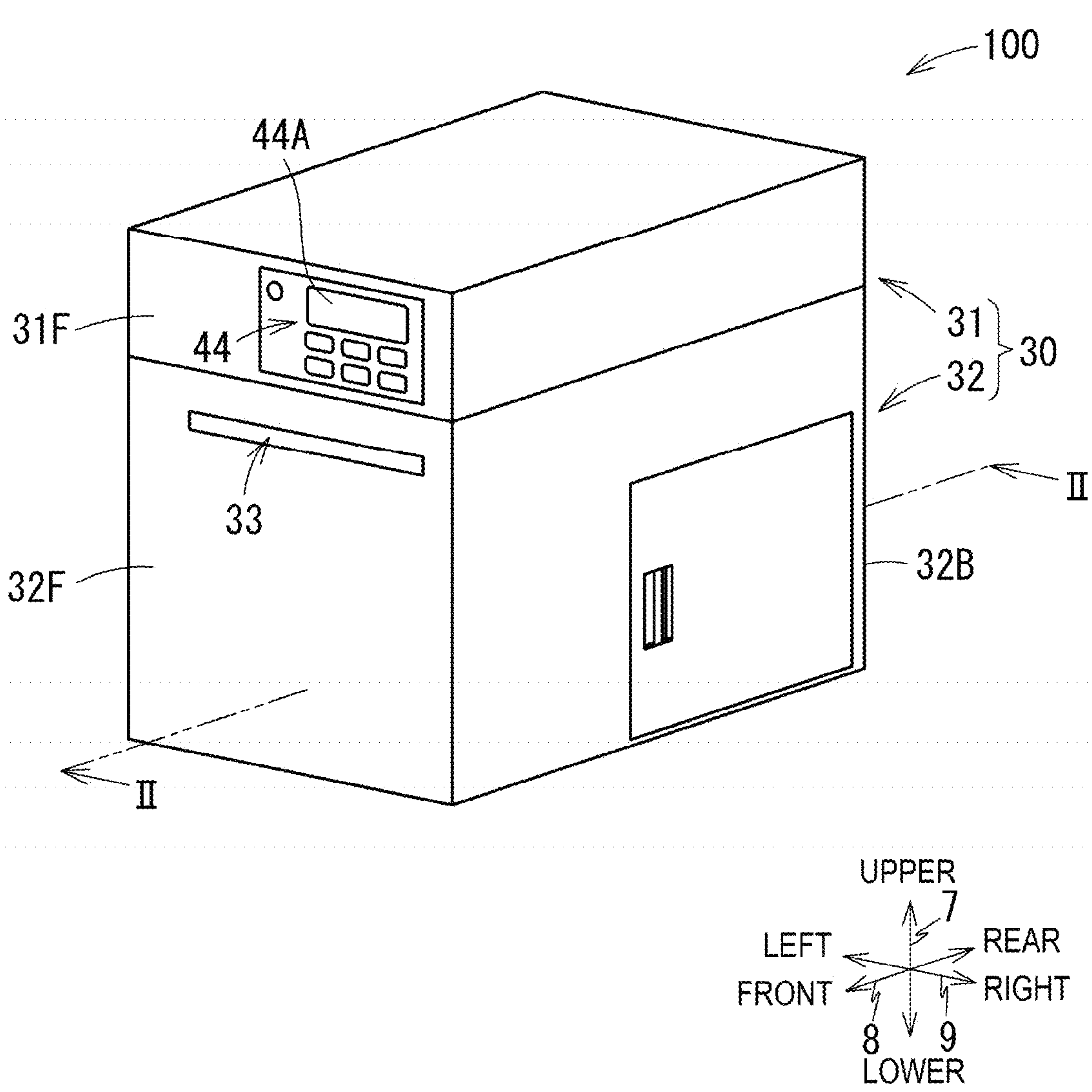
FIG. 1 is an external perspective view of an image recording device 100 according to an embodiment of the present disclosure.

As used herein, the words “a” and “an” and the like carry the meaning of “one or more.” When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

Hereinafter, a preferred embodiment of the present disclosure will be described. The present embodiment is merely one embodiment of the present disclosure, and it is needless to say that the embodiment can be modified without changing the gist of the present disclosure. In the following description, an advancement movement from a start point to an end point of an arrow is expressed as an “orientation”, and a unidirectional or bidirectional movement along a line connecting the start point and the end point of the arrow is expressed as a “direction”. In the following description, an up-down direction 7 is defined with reference to a state in which an image recording device 100 is usable (a state in FIG. 1), a front-rear direction 8 is defined with a side where an ejection port 33 is provided as a front side (a front surface), and a left-right direction 9 is defined when the image recording device 100 is viewed from the front side (the front surface). The front-rear direction 8 is an example of a first direction.

Appearance Configuration of Image Recording Device 100

The image recording device 100 illustrated in FIG. 1 records an image on a sheet S forming a roll body 37 (see FIG. 2) using an inkjet recording method. The image recording device 100 is an example of an inkjet printer.

As illustrated in FIG. 1, the image recording device 100 includes a housing 30. The housing 30 includes an upper housing 31 and a lower housing 32. The upper housing 31 and the lower housing 32 have a substantially rectangular parallelepiped shape as a whole and have a size capable of being placed on a table. That is, the image recording device 100 is suitable for being placed on a table and used. Of course, the image recording device 100 may be placed on a floor or a rack and used.

Figure 2:
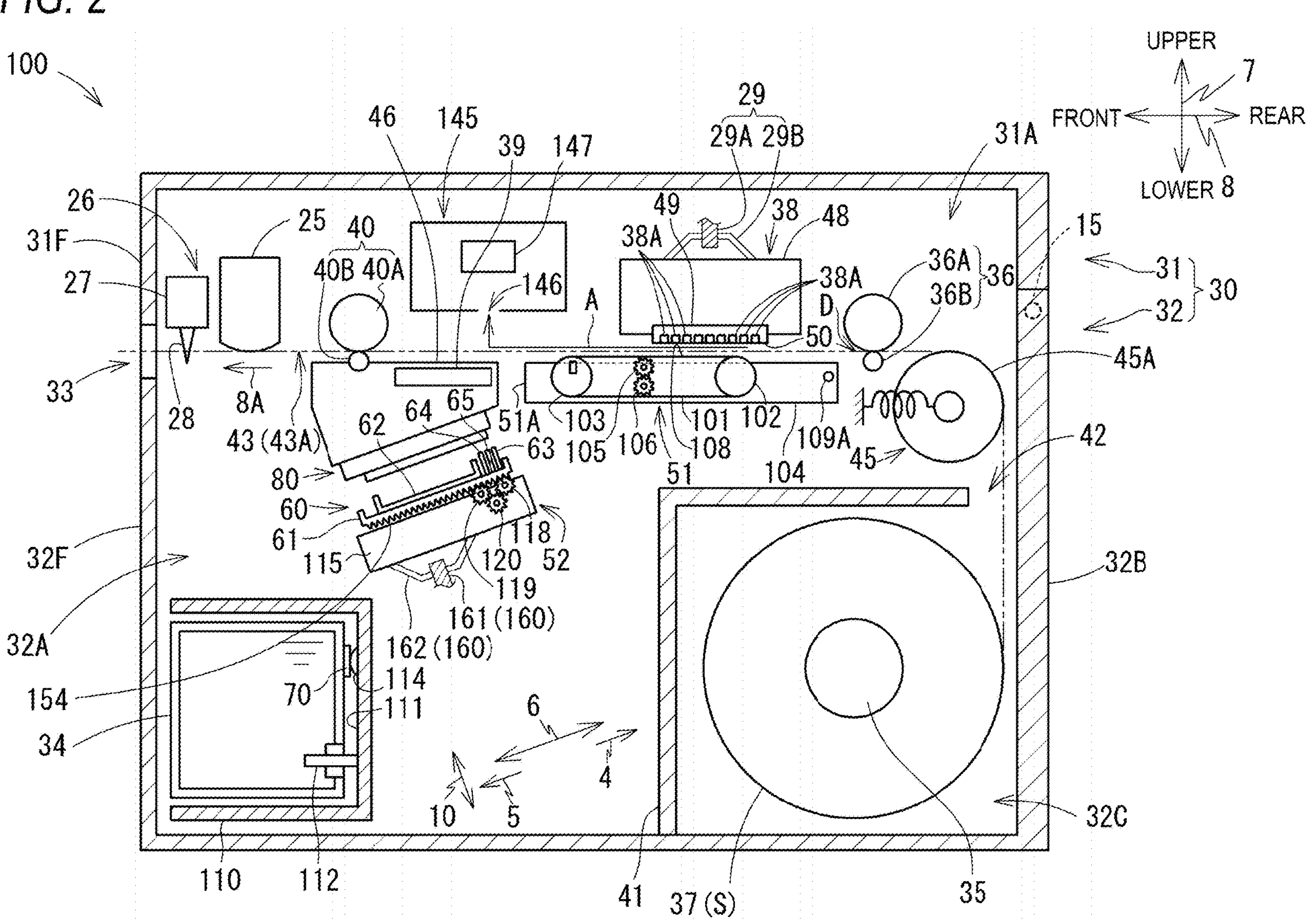
FIG. 2 is a cross-sectional view illustrating a cross section taken along a line II-II in FIG. 1, and illustrates a state in which a head 38 is in a recording position, a first support mechanism 51 is in a first posture, and a maintenance mechanism 60 is in a standby position.

As illustrated in FIG. 2, the housing 30 has an internal space 31A inside the upper housing 31 and an internal space 32A inside the lower housing 32, which are defined from the outside.

Figure 3:
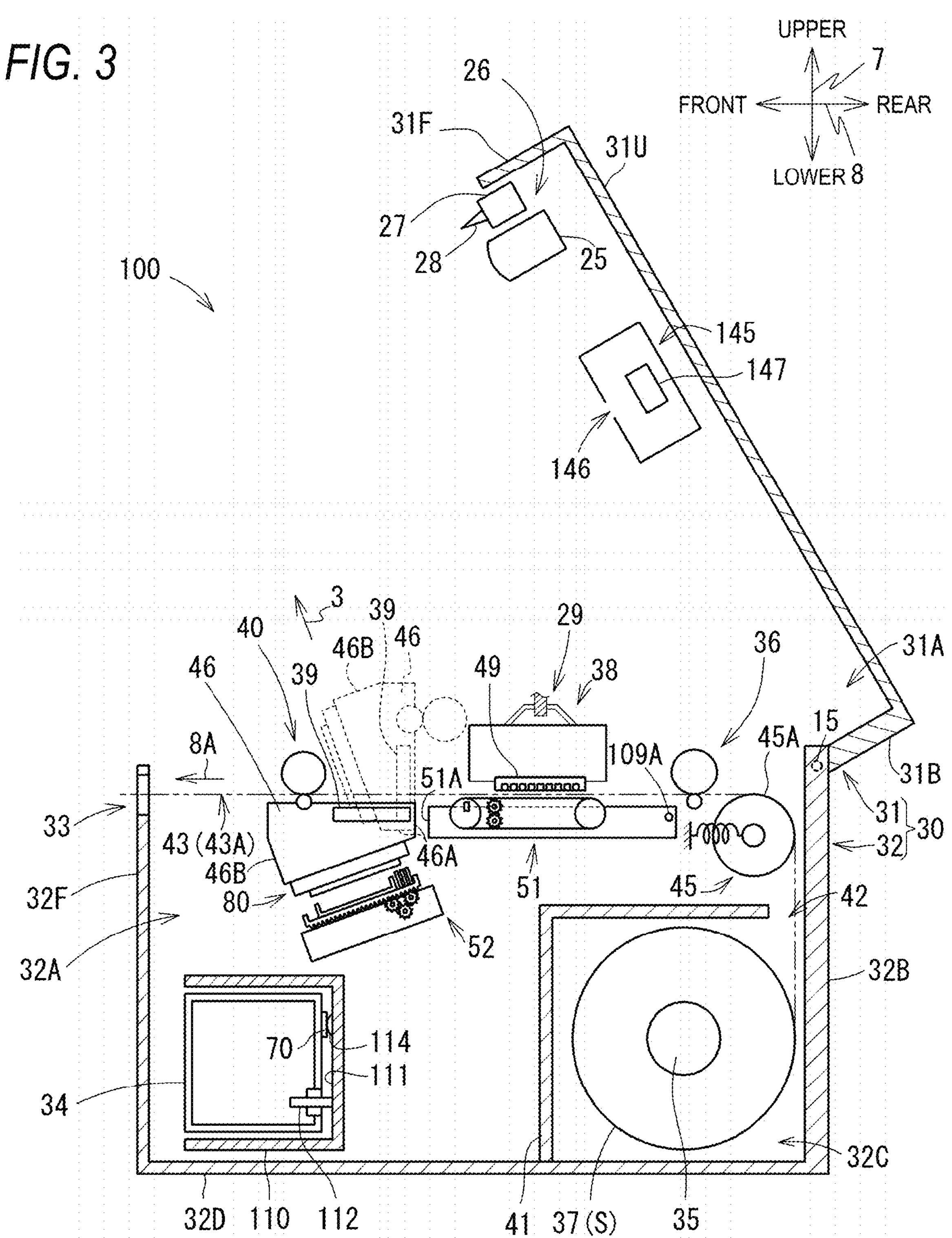
FIG. 3 is a cross-sectional view illustrating a state in which an upper housing 31 in FIG. 2 is in an open position.

As illustrated in FIGS. 2 and 3, the upper housing 31 is rotatably supported by the lower housing 32. The upper housing 31 is rotatable between a closed position illustrated in FIG. 2 and an open position illustrated in FIG. 3 around a rotation shaft 15 which is provided on a lower rear end portion and extends in the left-right direction 9.

As illustrated in FIG. 1, the slit-shaped ejection port 33 elongated in the left-right direction 9 is formed in a front surface 32F of the lower housing 32. An image-recorded sheet S (see FIG. 2) is ejected from the ejection port 33.

An operation panel 44 is provided on a front surface 31F of the upper housing 31. A user performs an input on the operation panel 44 to operate the image recording device 100 or confirm various settings. The operation panel 44 includes a display portion 44A. The display portion 44A displays that an ink tank 34 is to be mounted in a mounting case 110, that a preservation liquid tank 11 is to be mounted in the mounting case 110, and that a waste liquid tank 77 is to be replaced.

Internal Configuration of Image Recording Device 100

As illustrated in FIG. 2, a holder 35, a tensioner 45, a conveying roller pair 36, a conveying roller pair 40, a head 38, a first support mechanism 51, a heater 39, a support portion 46, a second support mechanism 52, a CIS 25, a cutter unit 26, the ink tank 34, a maintenance mechanism 60, and a wiper cleaning mechanism 80 are disposed in the internal spaces 31A and 32A. Although not illustrated in FIG. 2, a cleaning liquid tank 76, a liquid tank 78, the waste liquid tank 77, and a controller 130 (see FIG. 6) are disposed in the internal space 32A. The controller 130 controls an operation of the image recording device 100.

A partition wall 41 is provided in the internal space 32A. The partition wall 41 partitions a rear lower portion of the internal space 32A to define a sheet storage space 32C. The sheet storage space 32C is surrounded by the partition wall 41 and the lower housing 32.

The roll body 37 is stored in the sheet storage space 32C. The roll body 37 includes a core tube and an elongated sheet S. The sheet S is wound around the core tube in a roll shape in a circumferential direction of an axis of the core tube.

As illustrated in FIG. 2, the holder 35 extending in the left-right direction 9 is located in the sheet storage space 32C. When the roll body 37 is mounted, the holder 35 supports the roll body 37 such that the axis of the core tube of the roll body 37 extends along the left-right direction 9 and the roll body 37 is rotatable in the circumferential direction of the axis. The holder 35 rotates by a driving force transmitted from a conveying motor 53 (see FIG. 6). As the holder 35 rotates, the roll body 37 supported by the holder 35 also rotates.

The sheet storage space 32C opens upward at a rear portion thereof. A gap 42 is formed between the partition wall 41 and a rear surface 32B, that is, above a rear end of the roll body 37. When the conveying roller pairs 36 and 40 rotate, the sheet S is pulled out upward from the rear end of the roll body 37 and guided to the tensioner 45 through the gap 42.

The tensioner 45 is located above the partition wall 41 in a rear portion of the internal space 32A. The tensioner 45 has an outer circumferential surface 45A facing an outer side of the lower housing 32. An upper end of the outer circumferential surface 45A is located at substantially the same up-down position as a nip D of the conveying roller pair 36 in the up-down direction 7.

The sheet S pulled out from the roll body 37 is hung on and abuts against the outer circumferential surface 45A. The sheet S is curved forward along the outer circumferential surface 45A, extends in a conveying orientation 8A, and is guided to the conveying roller pair 36. The conveying orientation 8A is a forward orientation along the front-rear direction 8.

The conveying roller pair 36 is located in front of the tensioner 45. The conveying roller pair 36 includes a conveying roller 36A and a pinch roller 36B. The conveying roller 36A and the pinch roller 36B abut against each other at substantially the same up-down position as the upper end of the outer circumferential surface 45A to form the nip D.

The conveying roller pair 40 is located in front of the conveying roller pair 36. The conveying roller pair 40 includes a conveying roller 40A and a pinch roller 40B. The conveying roller 40A and the pinch roller 40B abut against each other at substantially the same up-down position as the upper end of the outer circumferential surface 45A to form a nip.

The conveying rollers 36A and 40A rotate by a driving force transmitted from the conveying motor 53 (see FIG. 6). The conveying roller pair 36 rotates while nipping the sheet S extending from the tensioner 45 in the conveying orientation 8A, thereby feeding the sheet S in the conveying orientation 8A along a conveying surface 43A of a conveying path 43 to be described later. The conveying roller pair 40 rotates while nipping the sheet S fed from the conveying roller pair 36, thereby feeding the sheet S in the conveying orientation 8A. In addition, the sheet S is pulled out from the sheet storage space 32C toward the tensioner 45 through the gap 42 by rotation of the conveying roller pairs 36 and 40.

As illustrated in FIG. 2, the conveying path 43 extending from the upper end of the outer circumferential surface 45A to the ejection port 33 is formed in the internal space 32A. The conveying path 43 extends substantially linearly along the conveying orientation 8A, and is a space through which the sheet S can pass. Specifically, the conveying path 43 extends along the conveying surface 43A that spreads in the conveying orientation 8A and the left-right direction 9 and is long in the conveying orientation 8A. In FIG. 2, the conveying surface 43A is indicated by a two-dot chain line indicating the conveying path 43. The conveying path 43 is defined by a guide member (not illustrated), the head 38, a conveying belt 101, the support portion 46, the heater 39, and the like, which are located apart from one another in the up-down direction 7. That is, the head 38, the conveying belt 101, the support portion 46, and the heater 39 are located along the conveying path 43.

The head 38 is located above the conveying path 43 and downstream of the conveying roller pair 36 in the conveying orientation 8A. The head 38 includes a plurality of nozzles 38A that are opened on a nozzle surface 50 (see FIGS. 4A and 4B). Ink is discharged downward from the plurality of nozzles 38A toward the sheet S supported by the conveying belt 101. Accordingly, an image is recorded on the sheet S. A configuration of the head 38 will be described later.

The first support mechanism 51 is located below the conveying path 43 and downstream of the conveying roller pair 36 in the conveying orientation 8A. The first support mechanism 51 is located below the head 38 and faces the head 38. The first support mechanism 51 includes the conveying belt 101 and a support member 104. The conveying belt 101 supports the sheet S, which is conveyed in the conveying orientation 8A by the conveying roller pair 36 and is located directly below the head 38. The conveying belt 101 conveys the supported sheet S in the conveying orientation 8A. The support member 104 can support the maintenance mechanism 60.

The first support mechanism 51 includes the conveying belt 101, a drive roller 102, a driven roller 103, the support member 104, a gear 105, and a gear 106.

The drive roller 102 and the driven roller 103 are rotatably supported by the support member 104. The drive roller 102 and the driven roller 103 are spaced apart from each other in the front-rear direction 8 (the conveying orientation 8A). The conveying belt 101 is an endless belt. The conveying belt 101 is stretched around the drive roller 102 and the driven roller 103. The conveying belt 101 is disposed in the conveying path 43 in the left-right direction 9.

The drive roller 102 rotates by a driving force applied by the conveying motor 53 (see FIG. 6) to cause the conveying belt 101 to rotate. As the conveying belt 101 rotates, the driven roller 103 rotates. The conveying belt 101 has a conveying surface 108. The conveying surface 108 is a portion on an upper side of an outer circumferential surface of the conveying belt 101 and extends along the conveying orientation 8A. The conveying surface 108 faces the nozzles 38A of the head 38 across the conveying path 43. The conveying surface 108 applies a conveying force to the sheet S while supporting the sheet S conveyed between the conveying roller pairs 36 and 40 from below. Accordingly, the conveying belt 101 conveys the sheet S located in the conveying path 43 in the conveying orientation 8A along the conveying surface 108.

The support member 104 includes a shaft 109A. The shaft 109A is rotatably supported by the lower housing 32. The shaft 109A extends in the left-right direction 9 (a direction orthogonal to the conveying orientation 8A and parallel to the nozzle surface 50 of a discharge module 49). The shaft 109A is provided upstream of the drive roller 102 in the conveying orientation 8A. The shaft 109A is located below the conveying roller pair 36.

The shaft 109A rotates by a driving force transmitted from a shaft motor 59 (see FIG. 6). As the shaft 109A rotates, the support member 104 rotates around the shaft 109A. A pivot distal end 51A of the first support mechanism 51 is located downstream of the shaft 109A in the conveying orientation 8A.

The support member 104 can change a posture thereof between a first posture (see FIG. 2) in which the support member 104 is parallel to the nozzle surface 50 of the discharge module 49 and a second posture (see FIG. 9) in which the support member 104 is inclined about the shaft 109A from the first posture and the pivot distal end 51A is located below the shaft 109A.

As illustrated in FIG. 2, when the first support mechanism 51 is in the first posture, the conveying surface 108 of the conveying belt 101 extends along the front-rear direction 8. Accordingly, the conveying belt 101 can convey the sheet S located in the conveying path 43 forward to the support portion 46.

Figure 9:
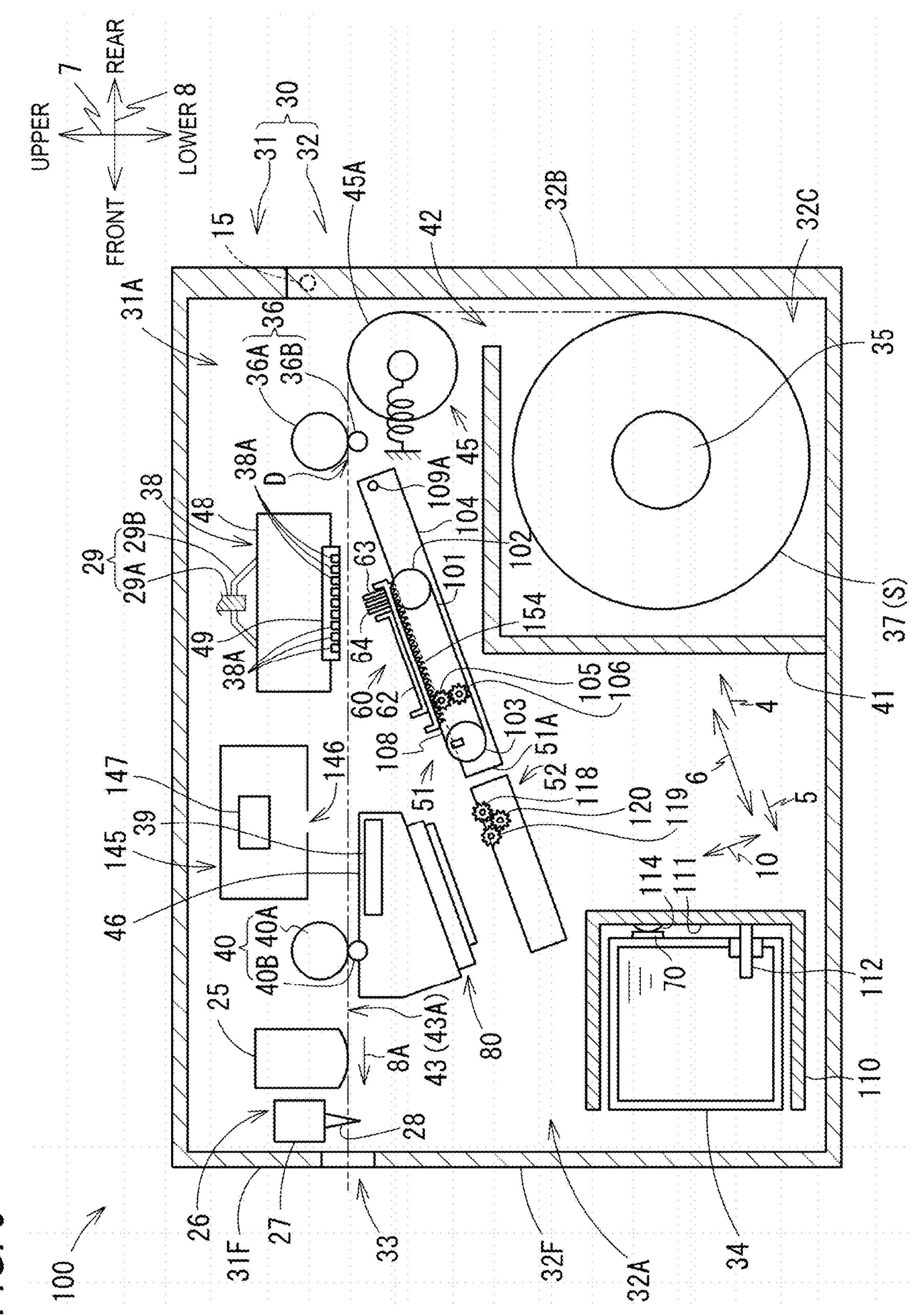
FIG. 9 is a cross-sectional view illustrating the cross section taken along the line II-II in FIG. 1, and illustrates a state in which the head 38 is in the recording position, the first support mechanism 51 is in a second posture, and the maintenance mechanism 60 is in a position supported by the first support mechanism 51.

As illustrated in FIG. 9, when the first support mechanism 51 is in the second posture, the conveying surface 108 of the conveying belt 101 extends along an inclination direction 6 that is downward toward the front. The inclination direction 6 is an orientation orthogonal to the left-right direction 9 and intersects the conveying orientation 8A. In addition, one side along the inclination direction 6 is defined as a forward inclination orientation 5, and the other side along the inclination direction 6 is defined as a backward inclination orientation 4.

As illustrated in FIG. 2, the gears 105 and 106 are rotatably supported by the support member 104 of the first support mechanism 51. The gear 106 is connected to a first motor 55 (see FIG. 6) directly or via another gear or the like, and is applied with a driving force from the first motor 55.

The heater 39 is located below the conveying path 43, downstream of the head 38 in the conveying orientation 8A, and upstream of the conveying roller pair 40 in the conveying orientation 8A. The heater 39 is supported by a frame in front of the first support mechanism 51, and extends in the left-right direction 9. The heater 39 includes a heat transfer plate (not illustrated) and a film heater (not illustrated). The heat transfer plate is made of metal and has a support surface spreading in front-rear and left-right directions at substantially the same up-down position as the conveying surface 108 of the conveying belt 101. The sheet S fed from the first support mechanism 51 is conveyed forward on the support surface of the heat transfer plate. The film heater is fixed to a lower surface of the heat transfer plate and generates heat under control of the controller 130. The heat is transferred to the sheet S on the heat transfer plate via the heat transfer plate. In addition, the heat from the heater 39 is recovered by a duct 145 disposed above the heater 39.

The duct 145 is disposed above the conveying path 43, downstream of the head 38 in the conveying orientation 8A, and upstream of the conveying roller pair 40. The duct 145 includes a suction port 146 that opens downward. The duct 145 includes an ejection port that opens on a left surface of the upper housing 31. An exhaust fan 147 is installed in the duct 145. A discharge port of the exhaust fan 147 faces the ejection port. An inlet port of the exhaust fan 147 faces the suction port 146. When the exhaust fan 147 is driven, an airflow A is generated in which air in the housing 30 flows toward the suction port 146. The airflow A flows in the conveying orientation 8A along the nozzle surface 50 at a position behind the suction port 146. Accordingly, an ink mist generated when the ink is discharged from the plurality of nozzles 38A flows into the duct 145 from the suction port 146 by being carried by the airflow A, and is ejected to the outside of the housing 30 through the ejection port. The exhaust fan 147 is an example of a fan.

The support portion 46 is located below the conveying path 43. The support portion 46 is located downstream of the head 38 and the first support mechanism 51 in the conveying orientation 8A. The heater 39 is located at a rear portion of the support portion 46. A front portion of the support portion 46 faces the conveying roller 40A. The support portion 46 is located upstream of the cutter unit 26 in the conveying orientation 8A.

The support portion 46 is supported by the lower housing 32 so as to be rotatable about an axis (not illustrated) extending in the left-right direction 9. As illustrated in FIG. 3, when the upper housing 31 is in the open position, the support portion 46 is rotatable between a laid-down position indicated by a solid line in FIG. 3 and an upright position indicated by a broken line in FIG. 3.

When the support portion 46 is in the laid-down position, a pivot distal end 46B of the support portion 46 is located in front of a pivot base end 46A (downstream in the conveying orientation 8A). When the support portion 46 is in the laid-down position, the support portion 46 constitutes a part of the conveying path 43 and can support the sheet S conveyed in the conveying orientation 8A by the conveying belt 101. When the support portion 46 is in the upright position, the pivot distal end 46B of the support portion 46 is located higher than when the support portion 46 is in the laid-down position, and the maintenance mechanism 60 can be exposed to the outside. A shaft of the support portion 46 is provided at a rear end portion of the support portion 46 and extends in the left-right direction 9.

The second support mechanism 52 is supported by the lower housing 32 so as to be movable in an orthogonal direction 10 orthogonal to the inclination direction 6 and the left-right direction 9. The second support mechanism 52 can support the maintenance mechanism 60. The second support mechanism 52 supports the maintenance mechanism 60 and slidably supports movement of the maintenance mechanism 60. The second support mechanism 52 is disposed in a state of extending in the inclination direction 6 as a whole, and is movable in a direction toward and away from the wiper cleaning mechanism 80 by a ball screw 160 illustrated in FIG. 2. Specifically, the ball screw 160 includes a screw shaft 161 and a nut member 162. The screw shaft 161 is supported by the lower housing 32 so as to be rotatable about an axis along the orthogonal direction 10. The screw shaft 161 rotates by a driving force transmitted from a vertical drive motor 163 (see FIG. 6). The nut member 162 moves upward by forward rotation of the screw shaft 161, and moves downward by reverse rotation of the screw shaft 161. A configuration for vertically moving the second support mechanism 52 in the orthogonal direction 10 is not limited to the configuration using the ball screw 160, and various known configurations can be adopted.

The gears 118, 119, and 120 are rotatably supported by a main body 115 of the second support mechanism 52. The gear 120 meshes with the gears 118 and 119. When the gear 120 rotates, the gears 118 and 119 rotate in the same direction. The gear 120 is connected to a second motor 56 (see FIG. 6) directly or via another gear or the like, and is applied with a driving force from the second motor 56. The gears 118 and 119 can mesh with a rack 154 of the maintenance mechanism 60 located at a facing position.

The CIS 25 is located above the conveying path 43 and downstream of the conveying roller pair 40 in the conveying orientation 8A. The CIS 25 can read an image on a printing surface of a sheet.

The cutter unit 26 is located above the conveying path 43 and downstream of the CIS 25 in the conveying orientation 8A. The cutter unit 26 includes a cutter 28 mounted on a cutter carriage 27. As the cutter 28 moves, the sheet S located on the conveying path 43 is cut along the left-right direction 9.

The mounting case 110 is located in the vicinity of a front end and a lower end of the lower housing 32, and has a box shape that opens toward the front. The ink tank 34 is inserted rearward into the mounting case 110. An ink needle 112 extending forward is located on a rearward end surface 111 of the mounting case 110. A front end of the ink needle 112 is open, and a rear end thereof is connected to the ink circuit 113. The ink circuit 113 connects an internal space of the ink needle 112 and the head 38 such that the ink can flow therethrough. When the ink tank 34 is mounted in the mounting case 110, the ink needle 112 is inserted into an outlet of the ink tank 34. Accordingly, the ink stored in the ink tank 34 is supplied to the head 38 through the ink needle 112 and the ink circuit 113. A configuration of the ink circuit 113 will be described later. A contact 114 is located on the end surface 111. The contact 114 is electrically connected to an IC substrate 70 provided on the ink tank 34 in a state in which the ink tank 34 is mounted in the mounting case 110. The controller 130 enables access to a storage area of the IC substrate 70 through the contact 114.

The ink tank 34 stores ink. The ink is a liquid containing a pigment and the like. An internal space of the ink tank 34 is a storage chamber that stores ink. The storage chamber may be in communication with the outside in the atmosphere, or may be a bag-shape chamber such as a pouch that can contract when ink flows out. The ink is supplied to the head 38 from the ink tank 34 mounted in the mounting case 110 through the ink circuit 113. The IC substrate 70 is located on a rear surface of the ink tank 34. The IC substrate 70 stores, in the storage area, identification information indicating the ink tank 34.

The cleaning liquid tank 76 is located below the second support mechanism 52. The cleaning liquid tank 76 stores a cleaning liquid containing a surfactant. The cleaning liquid is a liquid suitable for removing an unnecessary substance adhering to the nozzle surface 50 of the head 38. The surfactant is used to facilitate spreading of the cleaning liquid on a cleaning target. In other words, the surfactant is used to enhance detergency. On the other hand, when the surfactant is contained in the cleaning liquid, the surfactant is regularly arranged on a surface of the bubbles, and thus a film of the bubbles is not easily broken and foaming is facilitated. A ratio of the surfactant to a total amount of the cleaning liquid is preferably 0.001% or more and 5.0% or less. More preferably, the ratio of the surfactant to the total amount of the cleaning liquid is 0.01% or more and 2.0% or less. Still more preferably, the ratio of the surfactant to the total amount of the cleaning liquid is 0.01% or more and 1.0% or less. When the ratio of the surfactant to the total amount of the cleaning liquid is 0.01% or more, an effect of imparting wettability to the cleaning liquid is ensured. When the ratio of the surfactant to the total amount of the cleaning liquid is 2% or less, precipitation of a component of the cleaning liquid or an increase in viscosity of the cleaning liquid during drying is prevented. The surfactant is available by, for example, NEOPELEX G-15 manufactured by Kao Chemical Co., Ltd. and Sunnol NL-1430 manufactured by Lion Specialty Chemicals Co., Ltd. The cleaning liquid may further contain, for example, an organic solvent, a preservative, a solvent, and the like. As the organic solvent, for example, glycerin is used. The preservative is available by, for example, Proxel GXL manufactured by Lonza Japan Ltd. As the solvent, for example, water is used.

Figure 5:
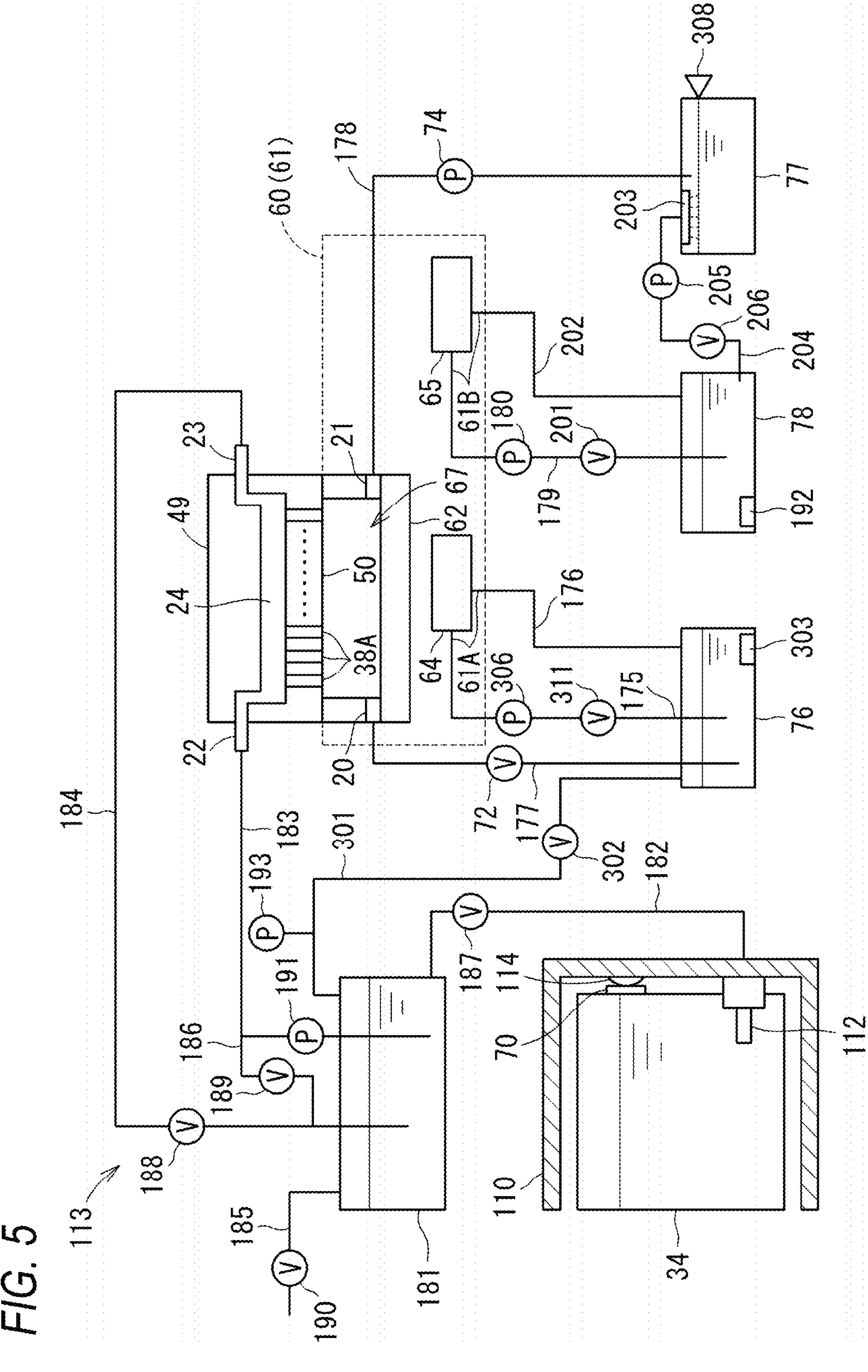
FIG. 5 is a schematic view illustrating an ink circuit 113.

As illustrated in FIG. 5, a cleaning liquid heating heater 303 is installed in the cleaning liquid tank 76. The cleaning liquid heating heater 303 heats the cleaning liquid stored in the cleaning liquid tank 76. A heating temperature of the cleaning liquid heating heater 303 is set to, for example, 60° C. ON/OFF of the cleaning liquid heating heater 303 is controlled by the controller 130.

One end of a first cleaning liquid supply tube 175 is connected to the cleaning liquid tank 76. The one end of the first cleaning liquid supply tube 175 opens at a position lower than a liquid level of the cleaning liquid stored in the cleaning liquid tank 76. The other end of the first cleaning liquid supply tube 175 is connected to the maintenance mechanism 60. The first cleaning liquid supply tube 175 is provided with a cleaning liquid supply pump 306. The cleaning liquid supply pump 306 supplies the cleaning liquid from the cleaning liquid tank 76 to the maintenance mechanism 60 through the first cleaning liquid supply tube 175. Driving of the cleaning liquid supply pump 306 is controlled by the controller 130. A wiper cleaning valve 311 is disposed in the first cleaning liquid supply tube 175. The wiper cleaning valve 311 is located between the cleaning liquid supply pump 306 and the cleaning liquid tank 76. The wiper cleaning valve 311 can open and close a flow path of the first cleaning liquid supply tube 175. Opening and closing of the wiper cleaning valve 311 is controlled by the controller 130. One end of a cleaning liquid return tube 176 is connected to the cleaning liquid tank 76. The one end of the cleaning liquid return tube 176 opens at a position higher than a water level of the cleaning liquid stored in the cleaning liquid tank 76. The other end of the cleaning liquid return tube 176 is connected to the maintenance mechanism 60.

A cleaning liquid introduction flow path 301 connected to an ink sub-tank 181 is connected to the cleaning liquid tank 76. A cleaning liquid introduction valve 302 capable of opening and closing the cleaning liquid introduction flow path 301 is disposed in the cleaning liquid introduction flow path 301. Opening and closing of the cleaning liquid introduction valve 302 is controlled by the controller 130. A decompression pump 193 is connected to the cleaning liquid introduction flow path 301. The decompression pump 193 depressurizes an internal space of the ink sub-tank 181 by ejecting a gas in the internal space of the ink sub-tank 181 to the outside. Driving of the decompression pump 193 is controlled by the controller 130.

The liquid tank 78 is located below the second support mechanism 52. The liquid tank 78 stores a liquid containing a defoaming agent. The liquid is suitable for removing bubbles of the cleaning liquid. Specifically, the liquid has a ratio of a defoaming distance to a foaming distance of 4.41% or more.

The foaming distance (also referred to as a first height) is a height of bubbles generated when the cleaning liquid is stirred for 1 minute by a stirrer, the cleaning liquid being put into a transparent glass bottle (standard bottle No. 5) having a capacity of 50 ml, a jacket diameter (inner diameter) of 38 mm, a height of 68.5 mm, and a mouth inner diameter of 24.7 mm so as to have a height of 20 mm by a pipette. As the stirrer, for example, a regular stirrer (model number: C7×20) manufactured by AS ONE CORPORATION can be used. The first height is determined by measuring, with a ruler, a length along the up-down direction 7 between a portion where an interface between the cleaning liquid and the bubbles is the lowest and a portion where the bubbles are the highest. The glass bottle is an example of a bottle.

The defoaming distance is a value obtained by subtracting, from the first height of the bubbles, a height (also referred to as a second height) of bubbles after 1 ml of the liquid is dropped into the glass bottle by the pipette after the first height is determined. The second height is determined by measuring, with a ruler, a length along the up-down direction 7 between a portion where the interface between the cleaning liquid and the bubbles is the lowest and a portion where the bubbles are the highest. The first height and the second height may be an average value of maximum heights measured by the ruler when sampling is performed a plurality of times.

The defoaming agent has a hydrophilic group and a hydrophobic group. The defoaming agent destroys the bubbles by penetration of defoaming agent molecules into a molecular arrangement of the surfactant in the cleaning liquid or replacement of a part of the molecular arrangement of the surfactant in the cleaning liquid with the defoaming agent molecules. As the defoaming agent, for example, those belonging to any of the group consisting of glycol ethers, silicones, and polyhydric alcohols are used.

Figure 11A:
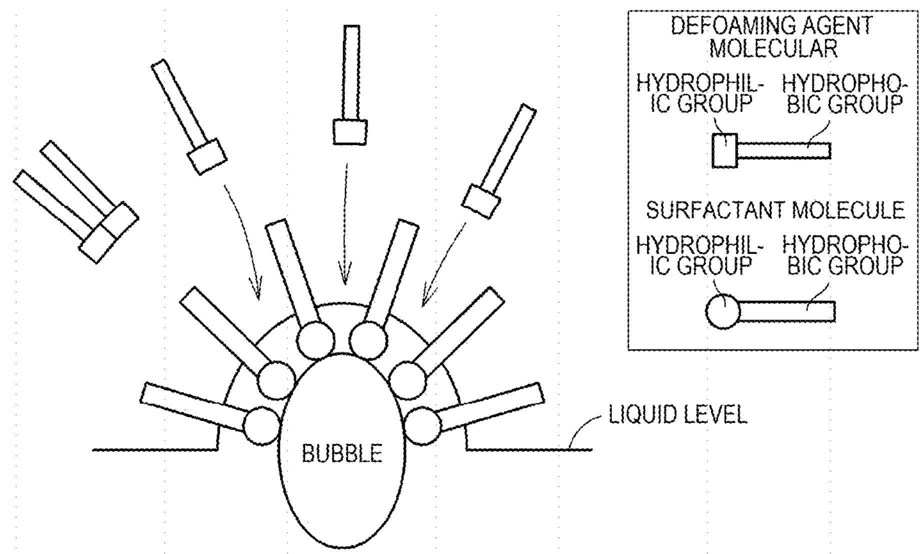
FIGS. 11A to 11C are views illustrating a defoaming mechanism of a defoaming agent belonging to silicones.
Figure 11B:
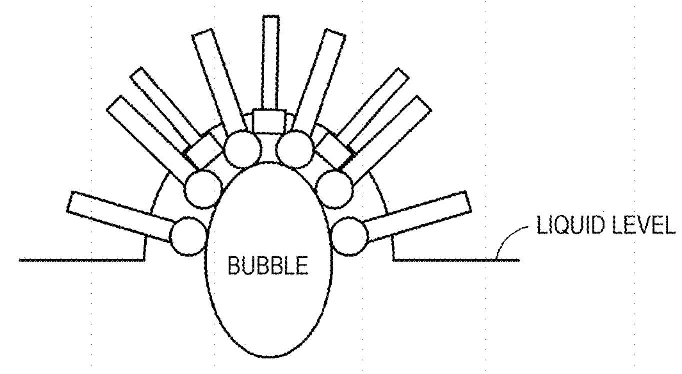
Figure 11C:
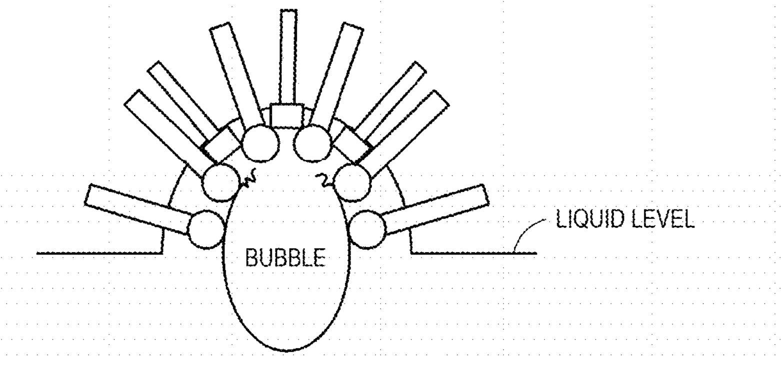

Since a defoaming agent belonging to silicones has lower surface energy and weaker cohesive force than a defoaming agent belonging to other types, the defoaming agent tends to spread thinly on the surface of the bubbles as illustrated in FIGS. 11A to 11C. Therefore, even in a small amount, the defoaming agent belonging to silicones is likely to act on many surfactants arranged on the surface of the bubbles, and thus has an excellent defoaming effect of removing the bubbles of the cleaning liquid. The defoaming agent belonging to silicones is available by, for example, SURFYNOL (registered trademark) DF-58 manufactured by Nissin Chemical Industry Co., Ltd., and BYK-093, BYK-024, BYK-025, and BYK-1650 manufactured by BYK Japan KK.

Figure 12A:
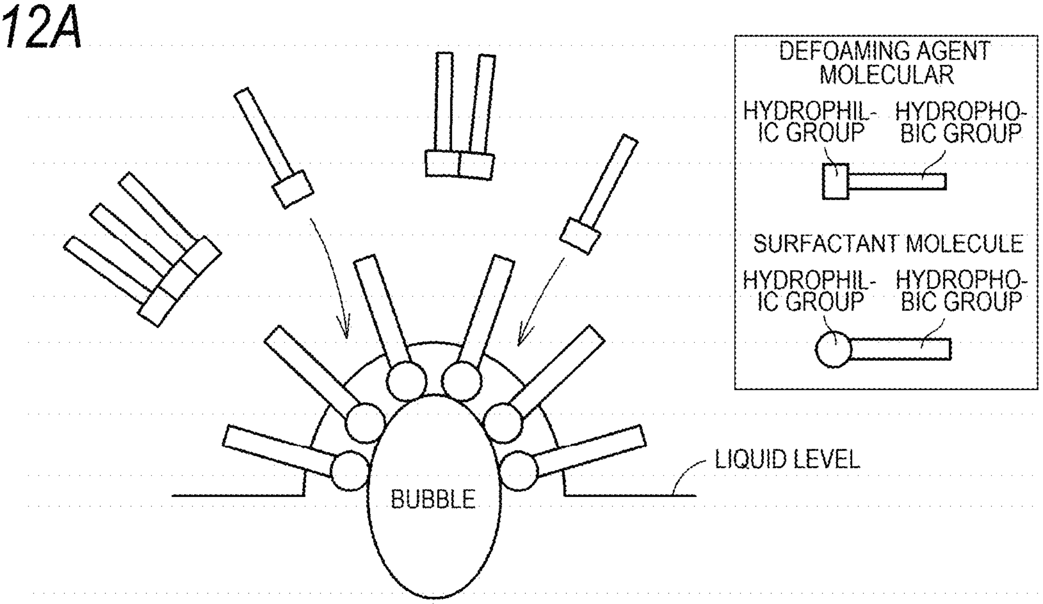
FIGS. 12A to 12C are views illustrating a defoaming mechanism of a defoaming agent belonging to polyhydric alcohols or glycol ethers.
Figure 12B:
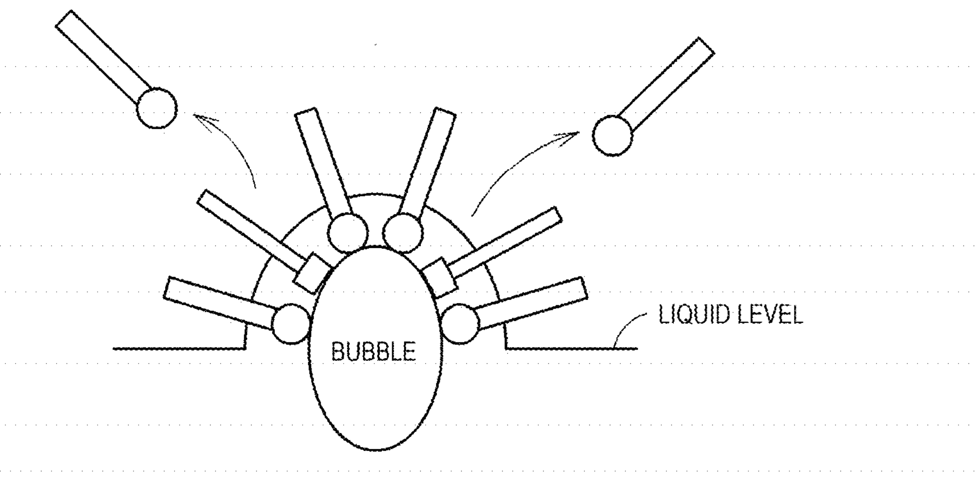
Figure 12C:
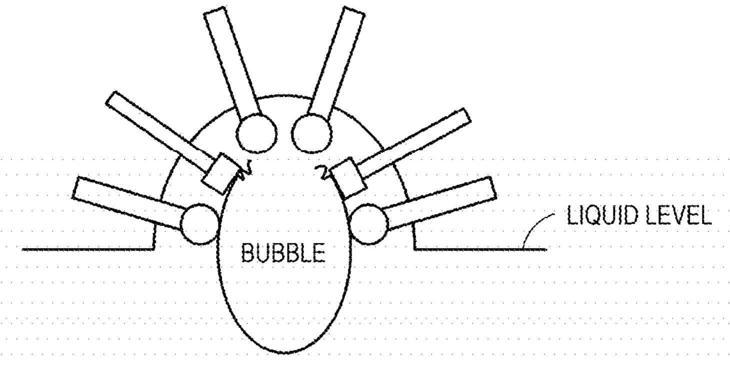

As compared with other organic solvents except those belonging to glycol ethers, the defoaming agent belonging to polyhydric alcohols has excellent defoaming effect since the defoaming agent belonging to polyhydric alcohols easily satisfies any of the following matters: having a hydrophilic group having a large affinity to water; and having a small surface energy. In a case where the affinity of the hydrophilic group contained in the defoaming agent to water is large, since the hydrophilic group of the defoaming agent is likely to bond to a film constituting the bubbles, as illustrated in FIGS. 12A to 12C, the defoaming agent is likely to approach the film of the bubbles, and a part of the molecular arrangement of the surfactant and the defoaming agent molecules are likely to be replaced. In a case where the surface energy of the defoaming agent is small, the defoaming agent is likely to spread thinly on the surface of the bubbles of the cleaning liquid, and thus is likely to act on the surfactant. Examples of the defoaming agent belonging to polyhydric alcohols include 1,2-hexanediol (1,2-HDL), 1,2-butanediol, 1,4-butanediol, 2-ethyl-1, and 3-hexanediol, and Surfynol AD01 manufactured by Nissin Chemical Industry Co., Ltd. A ratio of the defoaming agent belonging to polyhydric alcohols to the total amount of the liquid is preferably 6% or more. More preferably, the ratio of the defoaming agent belonging to polyhydric alcohols to the total amount of the liquid is 10% or more.

As compared with other organic solvents except those belonging to polyhydric alcohols, the defoaming agent belonging to glycol ethers has excellent defoaming effect since the defoaming agent belonging to glycol ethers easily satisfies any of the following matters: having a hydrophilic group having a large affinity to water; and having a small surface energy. In a case where the affinity of the hydrophilic group contained in the defoaming agent to water is large, since the hydrophilic group of the defoaming agent is likely to bond to a film constituting the bubbles, as illustrated in FIGS. 12A to 12C, the defoaming agent is likely to approach the film of the bubbles, and a part of the molecular arrangement of the surfactant and the defoaming agent molecules are likely to be replaced. In a case where the surface energy of the defoaming agent is small, the defoaming agent is likely to spread thinly on the surface of the bubbles of the cleaning liquid, and thus is likely to act on the surfactant. Examples of the defoaming agent belonging to glycol ethers include triethylene glycol monobutyl ether (BTG), dipropylene glycol monopropyl ether (PFDG), dipropyleneglycol monobutyl ether (BFDG), diethylene glycol monobutyl ether (BDG), and propylene glycol monobutyl ether (PnB). A ratio of the defoaming agent belonging to glycol ethers to the total amount of the liquid is preferably 20% or more. More preferably, the ratio of the defoaming agent belonging to glycol ethers to the total amount of the liquid is 30% or more. As the solvent, for example, water is used.

As illustrated in FIG. 5, a liquid heating heater 192 is installed in the liquid tank 78. The liquid heating heater 192 heats the liquid stored in the liquid tank 78. A heating temperature of the liquid heating heater 192 is set to, for example, 60° C. ON/OFF of the liquid heating heater 192 is controlled by the controller 130.

One end of a first liquid supply tube 179 is connected to the liquid tank 78. The one end of the first liquid supply tube 179 opens at a position higher than the liquid level of the liquid stored in the liquid tank 78. The other end of the first liquid supply tube 179 is connected to the maintenance mechanism 60. The first liquid supply tube 179 is provided with a first liquid supply pump 180. The first liquid supply pump 180 supplies the liquid in the liquid tank 78 to the maintenance mechanism 60 through the first liquid supply tube 179. Driving of the first liquid supply pump 180 is controlled by the controller 130. A first liquid supply valve 201 is disposed in the first liquid supply tube 179. The first liquid supply valve 201 is located between the liquid tank 78 and the first liquid supply pump 180. The first liquid supply valve 201 can open and close a flow path of the first liquid supply tube 179. Opening and closing of the first liquid supply tube 179 is controlled by the controller 130. One end of a liquid return tube 202 is connected to the liquid tank 78. The one end of the liquid return tube 202 opens at a position lower than the liquid level of the liquid stored in the liquid tank 78. The other end of the liquid return tube 202 is connected to the maintenance mechanism 60.

The waste liquid tank 77 is a container from which the cleaning liquid is ejected, and is in communication with the outside in the atmosphere. The waste liquid tank 77 is provided with a liquid level sensor 308. The liquid level sensor 308 is an optical sensor. The liquid level sensor 308 detects presence or absence of a waste liquid at a predetermined height in an internal space of the waste liquid tank 77. The liquid level sensor 308 outputs a detection signal to the controller 130. The liquid level sensor 308 outputs an ON signal as the detection signal when the cleaning liquid is detected, and outputs an OFF signal as the detection signal when the cleaning liquid is not detected. The controller 130 determines whether the liquid level reaches the predetermined height in the internal space of the waste liquid tank 77 based on the detection signal output from the liquid level sensor 308. A third liquid level sensor is not particularly limited as long as the third liquid level sensor can detect the presence or absence of the waste liquid at the predetermined height. For example, the third liquid level sensor may be a transmission-type optical sensor or a reflection-type optical sensor.

As illustrated in FIG. 5, a liquid spray device 203 is provided in the waste liquid tank 77. The liquid spray device 203 is located on a lower surface of an upper wall of the waste liquid tank 77. The liquid spray device 203 sprays the liquid supplied from the liquid tank 78 downward in a form of a mist. One end of a second liquid supply tube 204 is connected to the liquid spray device 203. The other end of the second liquid supply tube 204 is connected to the liquid tank 78. The other end of the second liquid supply tube 204 opens at a position lower than the liquid level of the liquid stored in the liquid tank 78. A second liquid supply pump 205 is provided in the second liquid supply tube 204. The second liquid supply pump 205 supplies the liquid in the liquid tank 78 to the liquid spray device 203 through the second liquid supply tube 204. Driving of the second liquid supply pump 205 is controlled by the controller 130. A second liquid supply valve 206 is disposed in the second liquid supply tube 204. The second liquid supply valve 206 is located between the liquid tank 78 and the second liquid supply pump 205. The second liquid supply valve 206 can open and close a flow path of the second liquid supply tube 204. Opening and closing of the second liquid supply tube 204 is controlled by the controller 130.

The maintenance mechanism 60 is for executing maintenance of the head 38. The maintenance mechanism 60 is configured to be movable, and is moved to a position directly below the head 38 when the maintenance of the head 38 is executed (see FIG. 7).

Figure 7:
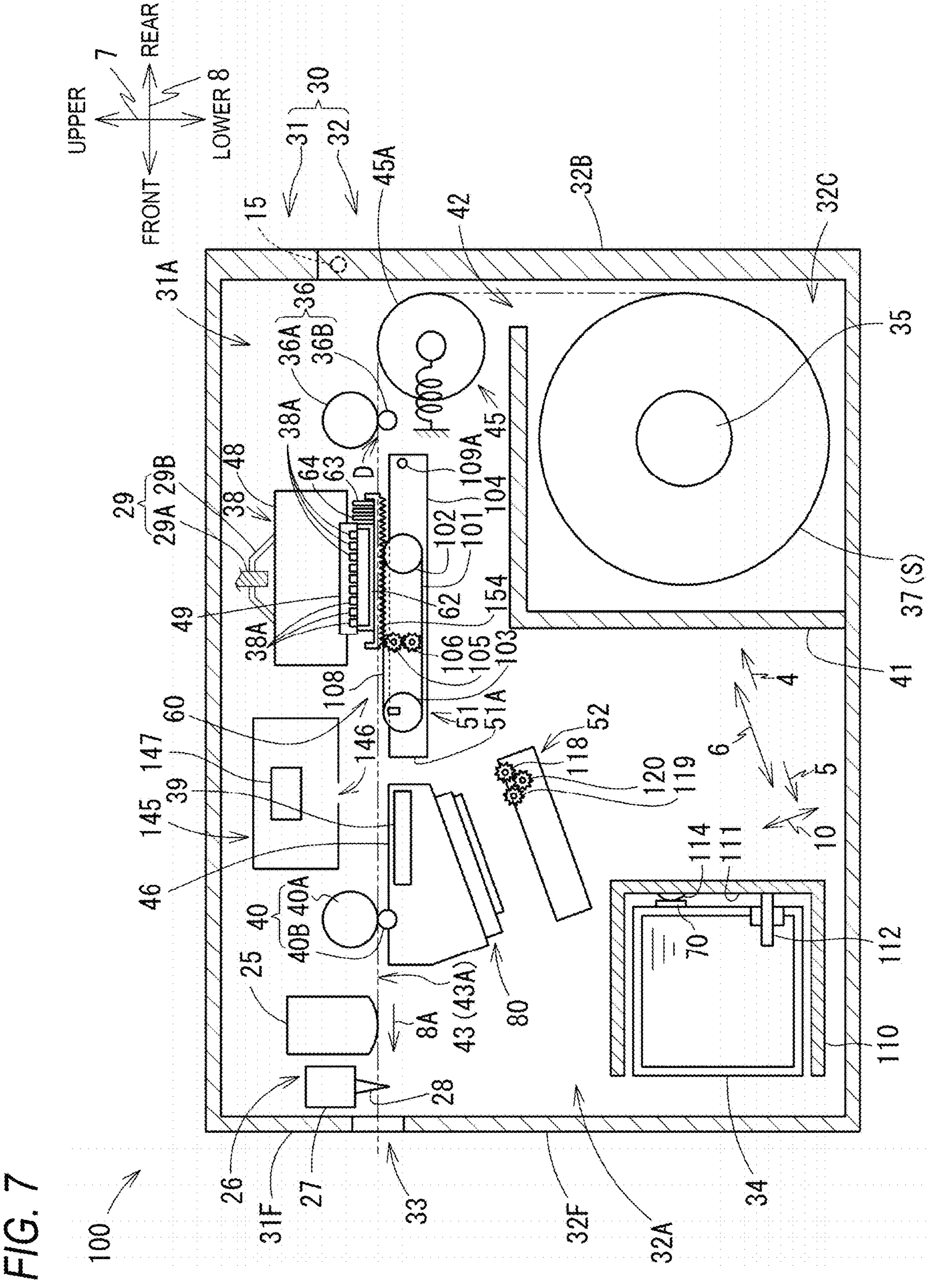
FIG. 7 is a cross-sectional view illustrating the cross section taken along the line II-II in FIG. 1, and illustrates a state in which the head 38 is in a capped position, the first support mechanism 51 is in the first posture, and the maintenance mechanism 60 is in a maintenance position.
Figure 8:
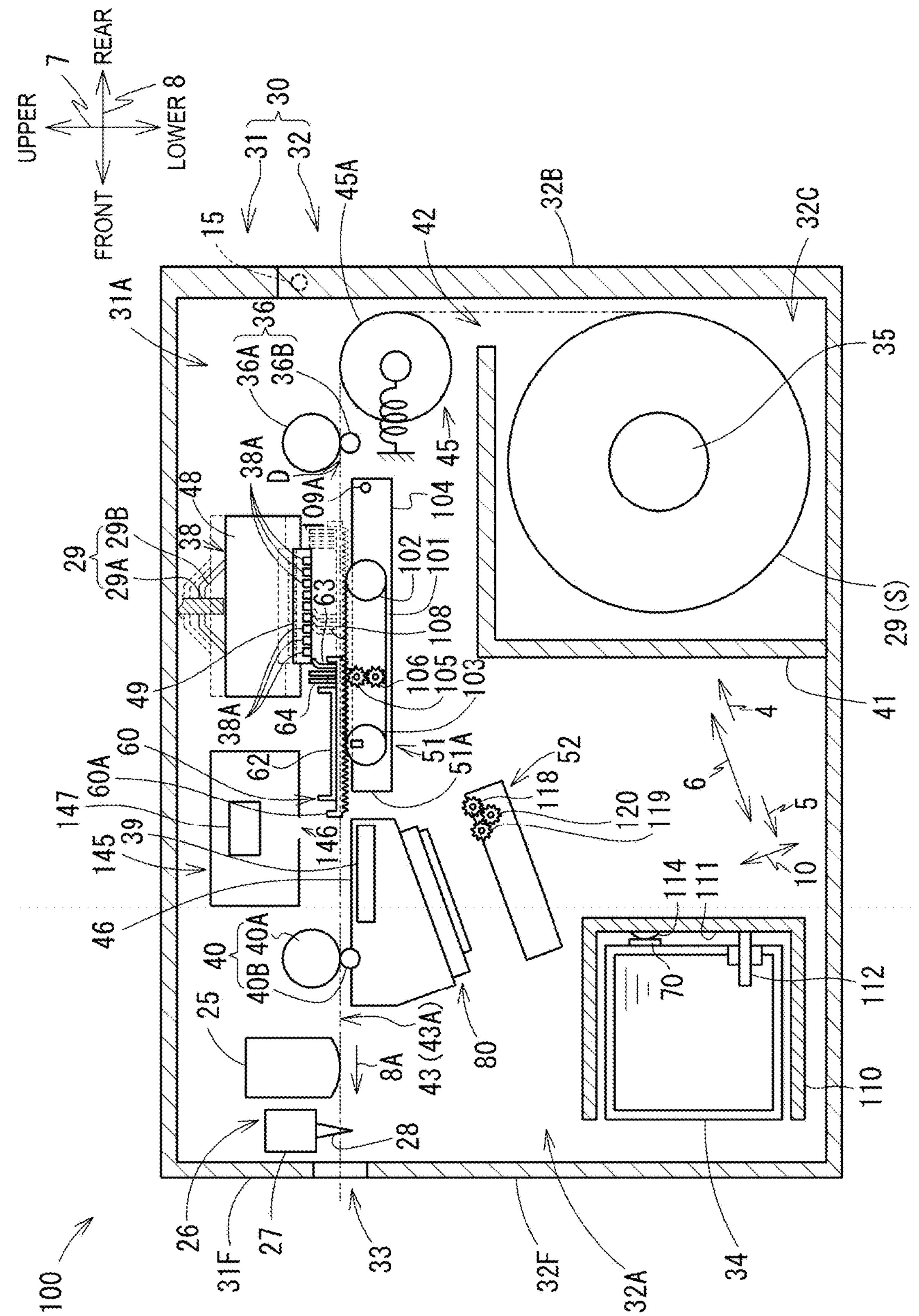
FIG. 8 is a cross-sectional view illustrating the cross section taken along the line II-II in FIG. 1, and illustrates a state in which the head 38 is in a wiped position, the first support mechanism 51 is in the first posture, and the maintenance mechanism 60 is in a wiping position.

The maintenance of the head 38 includes a purge process, a cap cleaning process, and a wiping process. As illustrated in FIGS. 5 and 7, the purge process is a process of covering the plurality of nozzles 38A with a cap 62 to be described later of the maintenance mechanism 60, and sucking ink from the plurality of nozzles 38A by a suction pump 74. The cap cleaning process is a process of cleaning the nozzle surface 50 of the head 38 with the cleaning liquid fed into an internal space 67 of the cap 62 in a state in which the nozzles 38A are covered with the cap 62. As illustrated in FIG. 8, the wiping process is a process of wiping the nozzle surface 50 of the head 38 with later-described first sponge wiper 64, second sponge wiper 65, and rubber wiper 63 of the maintenance mechanism 60. A configuration of the maintenance mechanism 60 will be described later.

The wiper cleaning mechanism 80 is for cleaning the cap 62 and the rubber wiper 63 of the maintenance mechanism 60. The maintenance mechanism 60 is moved directly below the wiper cleaning mechanism 80 when the cap 62 and the rubber wiper 63 are cleaned. A surface of the wiper cleaning mechanism 80 facing the maintenance mechanism 60 is formed by sponge and holds a maintenance liquid. The wiper cleaning mechanism 80 can abut against the cap 62, the first sponge wiper 64, the second sponge wiper 65, and the rubber wiper 63 located at a retraction position. Accordingly, the wiper cleaning mechanism 80 wipes ink adhered to the cap 62, the first sponge wiper 64, the second sponge wiper 65, and the rubber wiper 63.

Head 38

Figures 4A, 4B:
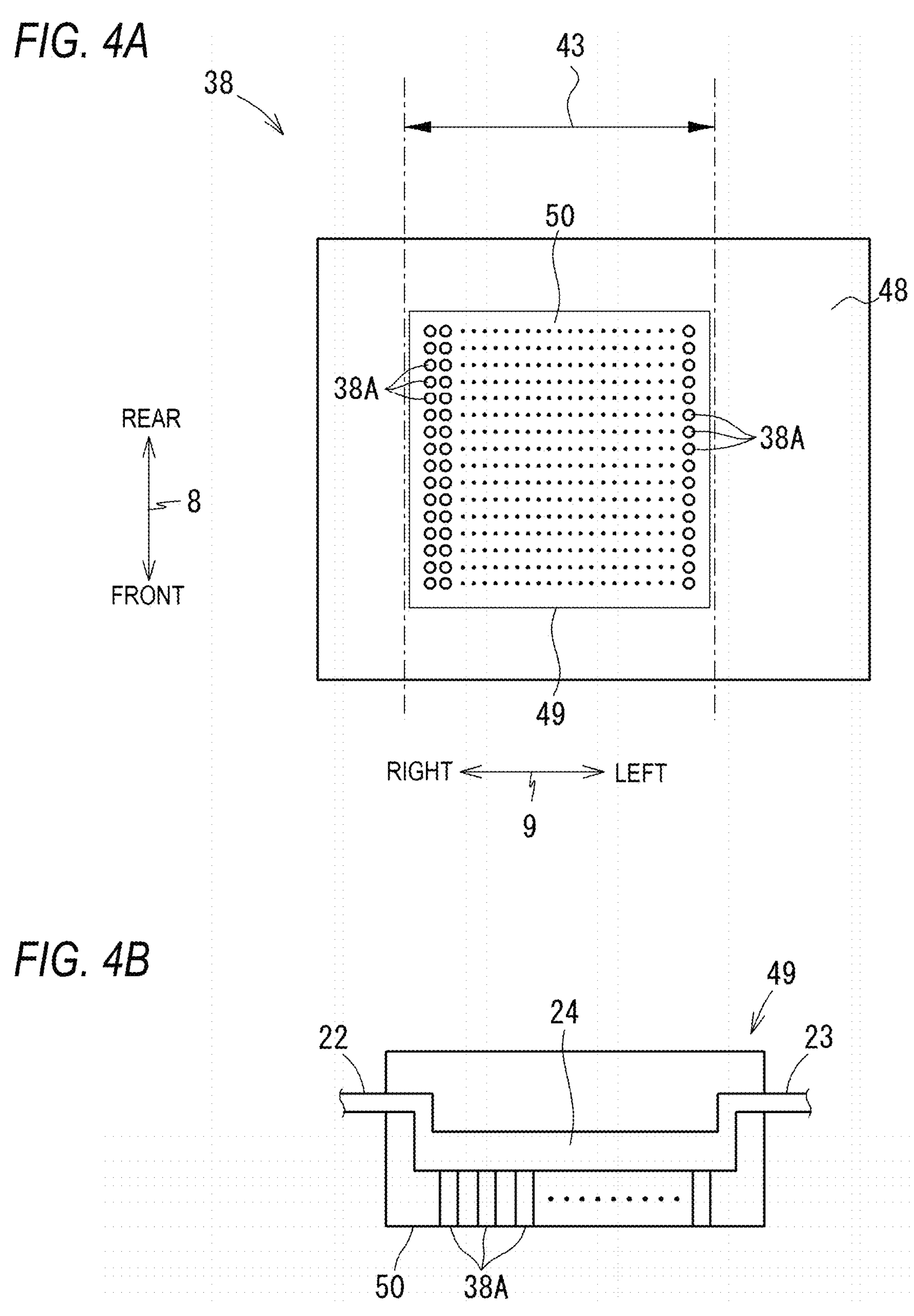
FIG. 4A and FIG. 4B are bottom views of the head 38.

As illustrated in FIGS. 2, 4A and 4B, the head 38 has a rectangular parallelepiped shape elongated substantially in the left-right direction 9. The head 38 includes a frame 48 and the discharge module 49. The number of the discharge module 49 is not limited to one, and may be, for example, plural.

The discharge module 49 is supported by the frame 48. A lower surface of the discharge module 49 is exposed downward. The discharge module 49 is disposed in the conveying path 43 in the left-right direction 9.

The discharge module 49 includes the plurality of nozzles 38A. Each nozzle 38A is opened on the nozzle surface 50 of the discharge module 49. The nozzle surface 50 is a surface spreading in the front-rear direction 8 and the left-right direction 9. As described above, the ink is discharged downward from the plurality of nozzles 38A toward the sheet S supported by the conveying belt 101 of the first support mechanism 51, and an image is recorded on the sheet S.

As illustrated in FIG. 4B and FIG. 5, the discharge module 49 includes an inflow port 22 and an outflow port 23 connected to the ink circuit 113. The inflow port 22 and the outflow port 23 are connected to a manifold 24, respectively. The manifold 24 is connected to the plurality of nozzles 38A. Ink that has flowed into the manifold 24 through the inflow port 22 is discharged to the outside through the nozzles 38A by piezoelectric elements (not illustrated) located corresponding to the respective nozzles 38A being driven. The ink in the manifold 24 can circulate through the inflow port 22 and the outflow port 23.

Figure 10:
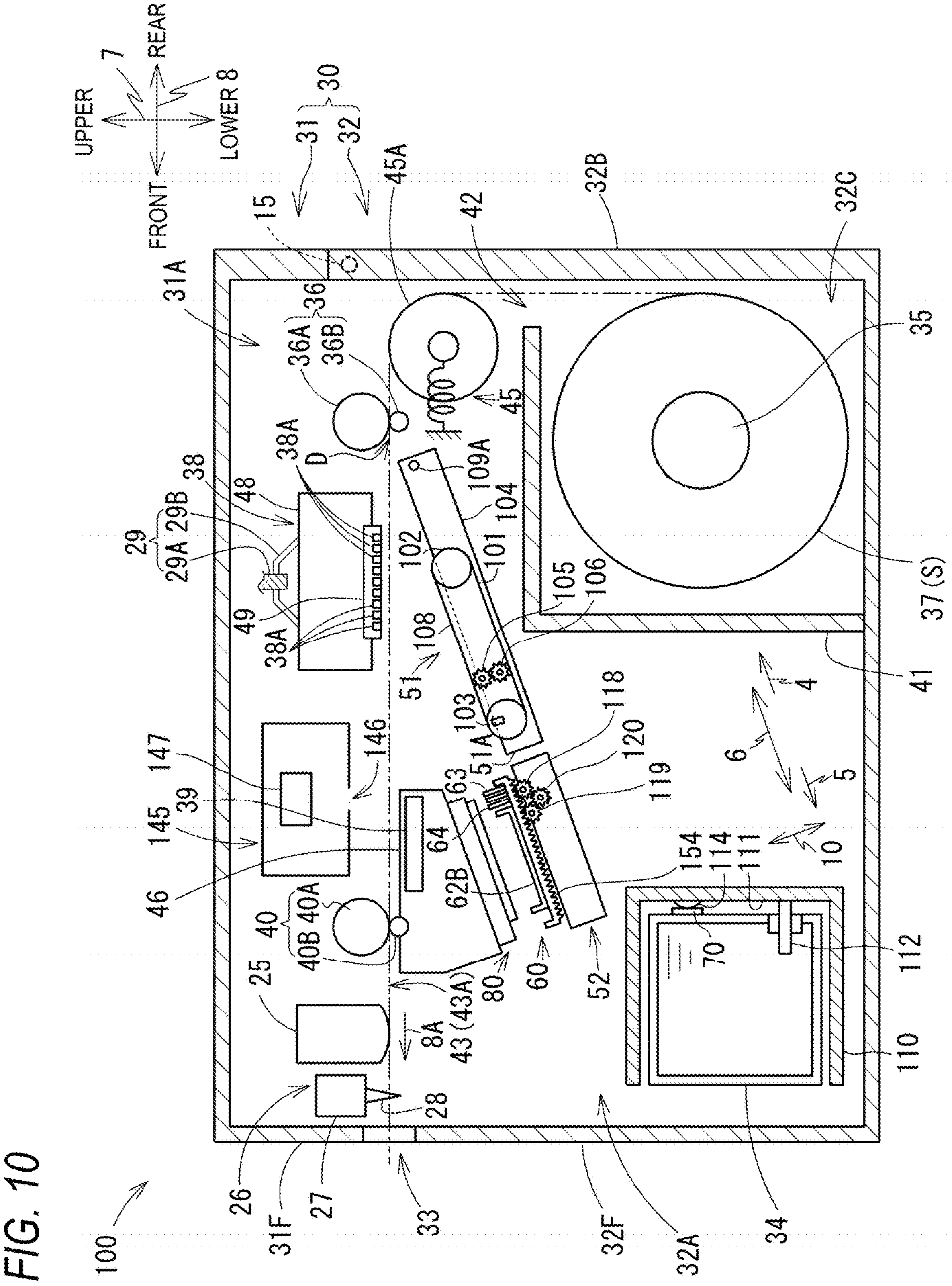
FIG. 10 is a cross-sectional view illustrating the cross section taken along the line II-II in FIG. 1, and illustrates a state in which the head 38 is in the recording position, the first support mechanism 51 is in the second posture, and the maintenance mechanism 60 is in the standby position.

The head 38 moves along the up-down direction 7 to a recording position illustrated in FIGS. 9 and 10, a capped position illustrated in FIG. 7, a wiped position indicated by a solid line in FIG. 8, and an uncapped position indicated by a broken line in FIG. 8. The recording position is a position of the head 38 when the image is recorded on the sheet S supported by the conveying belt 101. The capped position is a position of the head 38 when the discharge module 49 is covered with the cap 62 of the maintenance mechanism 60. The capped position is a position above the recording position (a position farther from the first support mechanism 51 than the recording position). The wiped position is a position of the head 38 when the first sponge wiper 64 and the second sponge wiper 65 of the maintenance mechanism 60 wipe the nozzle surface 50 of the discharge module 49. The wiped position is a position above the capped position. The uncapped position is a position of the head 38 when the head 38 is completely separated from the maintenance mechanism 60. The uncapped position is a position above the wiped position.

As illustrated in FIG. 2, the head 38 is moved by a ball screw 29. The ball screw 29 includes a screw shaft 29A and a nut member 29B. The screw shaft 29A is supported by the lower housing 32 so as to be rotatable about an axis along the up-down direction 7. The screw shaft 29A rotates by a driving force transmitted from a head motor 54 (see FIG. 6). The nut member 29B moves upward by forward rotation of the screw shaft 29A, and moves downward by reverse rotation of the screw shaft 29A. A configuration for allowing the head 38 to vertically move is not limited to the configuration using the ball screw 29, and various known configurations can be adopted.

Maintenance Mechanism 60

As illustrated in FIG. 2, the maintenance mechanism 60 includes a support base 61, the first sponge wiper 64, the second sponge wiper 65, the rubber wiper 63, and the cap 62. In the following description of the maintenance mechanism 60, the maintenance mechanism 60 is supported by the first support mechanism 51 and the second support mechanism 52 in the second posture.

The support base 61 has a box shape with an opening at the top. The support base 61 is provided with the rack 154. The rack 154 is located on a lower surface of a bottom wall of the support base 61. The rack 154 is located on the lower surface of the bottom wall of the support base 61 over the entire surface in the inclination direction 6. The rack 154 can mesh with the gear 105 of the first support mechanism 51. When the driving force of the first motor 55 is transmitted to the gear 105 via the gear 106 in a state in which the rack 154 and the gear 105 mesh with each other, the maintenance mechanism 60 slides in the inclination direction 6 along an upper surface of the first support mechanism 51 in the second posture. Similarly, the maintenance mechanism 60 slides in the front-rear direction 8 along the upper surface of the first support mechanism 51 in the first posture. The rack 154, the gears 105 and 106, and the first motor 55 are an example of a moving mechanism that causes the head and the support body to relatively move along the first direction. The support base 61 is an example of the support body.

The rack 154 can mesh with the gears 118 and 119 of the second support mechanism 52. When the driving force of the first motor 55 is transmitted to the gears 118 and 119 via the gear 120 in a state in which the rack 154 is meshed with at least one of the gears 118 and 119, the maintenance mechanism 60 slides in the inclination direction 6 along an upper surface of the second support mechanism 52.

Accordingly, as will be described later, the maintenance mechanism 60 is movable to a standby position illustrated in FIG. 2, a retraction position indicated by a broken line in FIG. 8, a maintenance position illustrated in FIG. 7, and a wiping position illustrated in FIG. 8. The maintenance mechanism 60 at the maintenance position and the wiping position faces the nozzle surface 50 of the discharge module 49 of the head 38 in the up-down direction 7. The maintenance mechanism 60 at the standby position and the retraction position is in a state of being separated from the nozzle surface 50.

A cleaning liquid flow path 61A connecting the other end of the first cleaning liquid supply tube 175 and the other end of the cleaning liquid return tube 176 is formed on an upper surface of the bottom wall of the support base 61 (see FIG. 5). The cleaning liquid flow path 61A has a recessed shape recessed downward from the upper surface of the bottom wall of the support base 61. Accordingly, the cleaning liquid supplied to the maintenance mechanism 60 through the first cleaning liquid supply tube 175 by driving of the cleaning liquid supply pump 306 flows through the cleaning liquid flow path 61A. The cleaning liquid flowing through the cleaning liquid flow path 61A is returned to the cleaning liquid tank 76 through the cleaning liquid return tube 176.

A liquid flow path 61B connecting the other end of the first liquid supply tube 179 and the other end of the liquid return tube 202 is formed on the upper surface of the bottom wall of the support base 61. The liquid flow path 61B has a recessed shape recessed downward from the upper surface of the bottom wall of the support base 61. Accordingly, the liquid supplied to the maintenance mechanism 60 through the first liquid supply tube 179 by driving of the first liquid supply pump 180 flows through the liquid flow path 61B. The liquid flowing through the liquid flow path 61B is returned to the liquid tank 78 through the liquid return tube 202.

First Sponge Wiper 64

As illustrated in FIGS. 2 and 5, the first sponge wiper 64 is supported by the support base 61. The first sponge wiper 64 is formed by sponge. The first sponge wiper 64 has a rectangular parallelepiped shape that is longer in the left-right direction 9 than in the up-down direction 7 and the inclination direction 6. A length of the first sponge wiper in the left-right direction 9 is longer than a length of the nozzle surface 50 in the left-right direction 9. The first sponge wiper 64 is held by a first holding fixture fixed to the upper surface of the bottom wall of the support base 61 in a state in which a lower end portion thereof is located in the cleaning liquid flow path 61A. Accordingly, the first sponge wiper 64 absorbs the cleaning liquid by coming into contact with the cleaning liquid flowing through the cleaning liquid flow path 61A. As a result, the first sponge wiper 64 is in a state of being impregnated with the cleaning liquid. The cleaning liquid not absorbed by the first sponge wiper 64 is returned to the cleaning liquid tank 76 through the cleaning liquid return tube 176.

The first holding fixture is not particularly limited as long as the first holding fixture can hold the first sponge wiper on the support base 61 in a state in which the lower end portion of the first sponge wiper 64 is located in the cleaning liquid flow path 61A. In a case where the number of the discharge module 49 is plural, a plurality of first sponge wipers 64 may be provided in accordance with the number of discharge module 49. For example, in a case where the number of the discharge module 49 is three, three first sponge wipers 64 may be provided in accordance with each discharge module 49. The first sponge wiper 64 is an example of the first wiper.

Second Sponge Wiper 65

The second sponge wiper 65 is supported by the support base 61. The second sponge wiper 65 is located in the backward inclination orientation 4 of the first sponge wiper 64 at an interval. The above-mentioned interval is set such that the second sponge wiper 65 immediately passes through a space through which the first sponge wiper 64 has passed when the support base 61 moves in the conveying orientation 8A. For example, the above-mentioned interval is set such that the second sponge wiper 65 passes through the space through which the first sponge wiper 64 has passed within five seconds when the support base 61 moves in the conveying orientation 8A. The above-mentioned interval is, for example, 5 cm or less.

The second sponge wiper 65 is formed by sponge. The second sponge wiper 65 has the same shape and size as the first sponge wiper 64. The second sponge wiper 65 has a rectangular parallelepiped shape that is longer in the left-right direction 9 than in the up-down direction 7 and the inclination direction 6. A length of the second sponge wiper 65 in the left-right direction 9 is longer than the length of the nozzle surface 50 in the left-right direction 9. The second sponge wiper 65 is held by a second holding fixture fixed to the upper surface of the bottom wall of the support base 61 in a state in which a lower end portion thereof is located in the liquid flow path 61B. Accordingly, the second sponge wiper 65 absorbs the liquid by coming into contact with the liquid flowing through the liquid flow path 61B. As a result, the second sponge wiper 65 is in a state of being impregnated with the liquid containing the defoaming agent. The liquid not absorbed by the second sponge wiper 65 is returned to the liquid tank 78 through the liquid return tube 202.

The second holding fixture is not particularly limited as long as the second holding fixture can hold the second sponge wiper 65 on the support base 61 in a state in which the lower end portion of the second sponge wiper 65 is located in the liquid flow path 61B. In a case where the number of the discharge module 49 is plural, a plurality of second sponge wipers 65 may be provided in accordance with the number of the discharge module 49. For example, in a case where the number of the discharge module 49 is three, three second sponge wipers 65 may be provided in accordance with each discharge module 49. The second sponge wiper 65 is an example of the second wiper.

Rubber Wiper 63

The rubber wiper 63 is supported by the support base 61. The rubber wiper 63 is located in the backward inclination orientation 4 of the second sponge wiper 65 at an interval. The rubber wiper 63 is formed by rubber. The rubber wiper 63 has a flat plate shape that is longer in the left-right direction 9 than in the up-down direction 7 and the inclination direction 6. A length of the rubber wiper 63 in the left-right direction 9 is longer than the length of the nozzle surface 50 in the left-right direction 9. An upper end portion of the rubber wiper 63 is formed such that a thickness thereof is reduced as it extends upward. The rubber wiper 63 is held by a third holding fixture fixed to the upper surface of the bottom wall of the support base 61. The third holding fixture is not particularly limited as long as the third holding fixture can hold the rubber wiper 63 on the support base 61. In addition, the first holding fixture, the second holding fixture, and the third holding fixture may be integrated. In a case where the number of the discharge module 49 is plural, a plurality of rubber wipers 63 may be provided in accordance with the number of the discharge module 49. For example, in a case where the number of the discharge module 49 is three, three rubber wipers 63 may be provided in accordance with each discharge module 49.

Cap 62

The cap 62 is supported by the support base 61. The cap 62 is located in the forward inclination orientation 5 of the first sponge wiper 64 at an interval. The cap 62 has a box shape with an open top. The cap 62 is formed of an elastic body such as rubber or silicon. The cap 62 can face the discharge module 49. When the maintenance mechanism 60 is located at the maintenance position, the cap 62 abuts against the nozzle surface 50 to seal the internal space 67 of the cap 62 (see FIG. 5). Accordingly, the cap 62 is in a state of covering the plurality of nozzles 38A.

As illustrated in FIG. 5, the cap 62 includes a supply flow path 20 and an ejection flow path 21. The supply flow path 20 and the ejection flow path 21 allow the internal space 67 of the cap 62 to communicate with the outside. One end of a second cleaning liquid supply tube 177 is connected to the supply flow path 20. The other end of the second cleaning liquid supply tube 177 is connected to the cleaning liquid tank 76. The other end of the second cleaning liquid supply tube 177 opens at a position lower than the liquid level of the cleaning liquid stored in the cleaning liquid tank 76. A cap cleaning valve 72 is provided in the second cleaning liquid supply tube 177. The cap cleaning valve 72 can open and close a flow path of the second cleaning liquid supply tube 177. Opening and closing of the cap cleaning valve 72 is controlled by the controller 130.

One end of a waste liquid tube 178 is connected to the ejection flow path 21. The other end of the waste liquid tube 178 is connected to the waste liquid tank 77. The other end of the waste liquid tube 178 opens at a position higher than the liquid level sensor 308. A suction pump 74 is provided in the waste liquid tube 178. When the suction pump 74 is driven in a state in which the cap 62 abuts against the nozzle surface 50 and the cap cleaning valve 72 is opened, the internal space 67 of the cap 62 becomes a negative pressure, and thus the cleaning liquid in the cleaning liquid tank 76 is supplied to the internal space 67 of the cap 62 through the second cleaning liquid supply tube 177. The cleaning liquid supplied to the internal space 67 of the cap 62 comes into contact with the nozzle surface 50 to clean the nozzle surface 50. The cleaning liquid that has cleaned the nozzle surface 50 is ejected to the waste liquid tank through the waste liquid tube 178. Driving of the suction pump 74 is controlled by the controller 130.

In a case where the number of the discharge module 49 is plural, a plurality of caps 62 may be provided in accordance with the number of the discharge module 49. For example, in a case where the number of the discharge module 49 is three, three caps 62 may be provided in accordance with each discharge module 49.

Ink Circuit 113

As illustrated in FIG. 5, the mounting case 110 and the discharge module 49 are connected by the ink circuit 113. The ink circuit 113 includes the ink sub-tank 181, flow paths 182, 183, and 184, an atmospheric flow path 185, a bypass flow path 186, a replenishment valve 187, a purge shutoff valve 188, a bypass valve 189, an atmospheric release valve 190, and a positive pressure pump 191.

The ink sub-tank 181 is located above the mounting case 110 in the internal space of the housing 30. The ink sub-tank 181 stores ink in an internal space thereof. The internal space of the ink sub-tank 181 communicates with the ink needle 112 of the mounting case 110 through the flow path 182. In a state in which the ink tank 34 is mounted in the mounting case 110, the ink stored in the ink tank 34 can flow into the ink sub-tank 181 through the flow path 182. The replenishment valve 187 is located in the flow path 182. The replenishment valve 187 is controlled by the controller 130 to open and close the flow path 182.

The internal space of the ink sub-tank 181 and the inflow port 22 of the discharge module 49 communicate with each other through the flow path 183. The ink stored in the internal space of the ink sub-tank 181 can be supplied to the discharge module 49 through the flow path 183. The positive pressure pump 191 is located in the flow path 183. The positive pressure pump 191 is operated by the controller 130 controlling driving of a pump motor 138 (see FIG. 6).

The internal space of the ink sub-tank 181 and the outflow port 23 of the discharge module 49 communicate with each other through the flow path 184. The ink in the manifold 24 of the discharge module 49 can be ejected to the ink sub-tank 181 through the flow path 184. The purge shutoff valve 188 is located in the flow path 184. The purge shutoff valve 188 is controlled by the controller 130 to open and close the flow path 184.

The bypass flow path 186 is connected between the positive pressure pump 191 and the inflow port 22 in the flow path 183 and between the purge shutoff valve 188 and the ink sub-tank 181 in the flow path 184. The bypass valve 189 is located in the bypass flow path 186. The bypass valve 189 is controlled by the controller 130 to open and close the bypass flow path 186.

The internal space of the ink sub-tank 181 communicates with the outside through the atmospheric flow path 185. The atmospheric release valve 190 is located in the atmospheric flow path 185. The atmospheric release valve 190 is controlled by the controller 130 to open and close the atmospheric flow path 185.

Controller 130

As illustrated in FIG. 6, the controller 130 includes a CPU 131, a ROM 132, a RAM 133, an EEPROM 134, and an ASIC 135, which are connected by an internal bus 137. The ROM 132 stores programs for controlling various operations of the CPU 131. The RAM 133 is used as a storage area for temporarily storing data, signals, and the like used when the CPU 131 executes the above-mentioned programs, or as a work area for data processing. The EEPROM 134 stores settings, flags, and the like to be held even after power is turned off.

The conveying motor 53, the head motor 54, the first motor 55, the second motor 56, the cleaning liquid supply pump motor 307, the first liquid supply pump motor 309, the second liquid supply pump motor 310, the suction pump motor 58, the pump motors 138 and 139, the shaft motor 59, and the vertical drive motor 163 are connected to the ASIC 135. In addition, the cap cleaning valve 72, the replenishment valve 187, the purge shutoff valve 188, the bypass valve 189, the atmospheric release valve 190, the cleaning liquid introduction valve 302, the wiper cleaning valve 311, the first liquid supply valve 201, and the second liquid supply valve 206 are connected to the ASIC 135. Each valve is connected to the ASIC 135 via a drive circuit for driving the valve.

The ASIC 135 generates a drive signal for causing each motor to rotate, and controls each motor based on the drive signal. Each motor rotates forward or backward according to the drive signal from the ASIC 135. The controller 130 controls driving of the conveying motor 53 to cause the holder 35, the conveying roller 36A, the conveying roller 40A, and the drive roller 102 to rotate. The controller 130 controls driving of the head motor 54 to cause the screw shaft 29A to rotate and cause the head 38 to move in the up-down direction 7. The controller 130 controls driving of the shaft motor 59 to cause the first support mechanism 51 to rotate. The controller 130 controls driving of the first motor 55 to cause the gear 106 of the first support mechanism 51 to rotate. The controller 130 controls driving of the vertical drive motor 163 to cause the screw shaft 161 to rotate and cause the second support mechanism 52 to move along the orthogonal direction 10. The controller 130 controls driving of the second motor 56 to cause the gear 120 of the second support mechanism 52 to rotate. The controller 130 controls driving of the cleaning liquid supply pump motor 307 to drive the cleaning liquid supply pump 306. The controller 130 controls driving of the first liquid supply pump motor 309 to drive the first liquid supply pump 180. The controller 130 controls driving of the second liquid supply pump motor 310 to drive the second liquid supply pump 205. The controller 130 controls driving of the suction pump motor 58 to drive the suction pump 74. The controller 130 controls driving of the pump motor 138 to drive the positive pressure pump 191. The controller 130 controls driving of the pump motor 139 to drive the decompression pump 193.

The operation panel 44, the display portion 44A, the contact 114, the liquid level sensor 308, and a piezoelectric element (not illustrated) are connected to the ASIC 35. The operation panel 44 outputs an operation signal corresponding to an operation by the user to the controller 130. The operation panel 44 may include, for example, a push button, or a touch sensor superimposed on a display. The controller 130 reads the identification information from the storage area of the IC substrate 70 of the ink tank 34 through the contact 114. The controller 130 causes the display portion 44A to display that the ink tank 34 is mounted in the mounting case 110 based on the identification information. The controller 130 receives a detection signal from the liquid level sensor 308. The controller 130 causes the display portion 44A to display that the waste liquid tank 77 is to be replaced based on the detection signal from the liquid level sensor 308. The piezoelectric element operates by being supplied with power from the controller 130 via a drive circuit (not illustrated). The controller 130 controls the power supply to the piezoelectric element, and causes ink droplets to be selectively discharged from the plurality of nozzles 38A.

Hereinafter, a maintenance method using the maintenance mechanism 60 of the image recording device 100 will be described.

Purge Process

When the image recording process is not executed, the image recording device 100 is in a standby state. In the standby state, as illustrated in FIG. 7, the head 38 is located at the capped position, the first support mechanism 51 is located in the first posture in a state of supporting the maintenance mechanism 60, and the maintenance mechanism 60 is located at the maintenance position. In this case, the cap 62 covers the plurality of nozzles 38A by abutting against the nozzle surface 50.

In the standby state, the controller 130 executes the purge process at a predetermined timing or when a command from the outside is received. Hereinafter, a description will be given of a process executed when the controller 130 receives a command to execute the purge process from the outside while the image recording device 100 is in the standby state.

In the purge process, the controller 130 drives the suction pump 74 in a state in which the purge shutoff valve 188 and the bypass valve 189 are opened and the replenishment valve 187, the atmospheric release valve 190, and the cap cleaning valve 72 are closed. Accordingly, the ink in the plurality of nozzles 38A is sucked into the internal space 67 of the cap 62 and ejected to the waste liquid tank 77 through the waste liquid tube 178. In this case, since the cap cleaning valve 72 is closed, the cleaning liquid is not supplied from the cleaning liquid tank 76 to the cap 62 through the second cleaning liquid supply tube 177.

Cleaning Process

Next, the controller 130 executes the cleaning process. Specifically, the controller 130 first drives the suction pump 74 in a state in which the cap cleaning valve 72 is opened and the replenishment valve 187, the purge shutoff valve 188, the bypass valve 189, and the atmospheric release valve 190 are closed. Accordingly, the cleaning liquid is supplied from the cleaning liquid tank 76 to the internal space 67 of the cap 62 through the second cleaning liquid supply tube 177. As a result, the nozzle surface 50 is cleaned by being immersed with the cleaning liquid. In this case, since the purge shutoff valve 188 and the bypass valve 189 are closed, the ink is not ejected from the plurality of nozzles 38A of the head 38 to the internal space 67 of the cap 62.

Next, the controller 130 moves the head 38 to the uncapped position, and then drives the suction pump 74 in a state in which the cap cleaning valve 72 is closed. Accordingly, the cleaning liquid is ejected from the internal space 67 of the cap 62 into the waste liquid tank 77 through the waste liquid tube 178. As a result, the ink remaining in the internal space 67 of the cap 62 and the waste liquid tube 178 is washed away by the cleaning liquid. In this case, since the cleaning liquid contains a surfactant in order to enhance the detergency, bubbles of the cleaning liquid may be generated in the waste liquid tank 77. When the bubbles of the cleaning liquid increase in the waste liquid tank 77, detection accuracy of the liquid level sensor 308 is reduced.

Therefore, after the cleaning process is completed, the controller 130 causes the second liquid supply pump 205 to operate by driving the second liquid supply pump motor 310 in a state in which the second liquid supply valve 206 is opened. Accordingly, the liquid containing the defoaming agent in the liquid tank 78 is supplied to the liquid spray device 203 through the second liquid supply tube 204. The liquid spray device 203 to which the liquid is supplied sprays the liquid downward in a form of a mist. As a result, the defoaming agent comes into contact with the bubbles of the cleaning liquid in the waste liquid tank 77, and thus the bubbles of the cleaning liquid disappear. The waste liquid tank 77 is an example of the predetermined portion.

Wiping Process

Next, the controller 130 executes the wiping process. Specifically, the controller 130 first executes a heating process. In the heating process, the controller 130 first turns on the cleaning liquid heating heater 303 and the liquid heating heater 192. Accordingly, the cleaning liquid stored in the cleaning liquid tank 76 is heated by the cleaning liquid heating heater 303. At the same time, the liquid stored in the liquid tank 78 is heated by the liquid heating heater 192.

Next, the controller 130 causes the cleaning liquid supply pump 306 to operate by driving the cleaning liquid supply pump motor 307 in a state in which the wiper cleaning valve 311 is opened. Accordingly, the cleaning liquid in the cleaning liquid tank 76 circulates between the first sponge wiper 64 and the cleaning liquid tank 76 through the first cleaning liquid supply tube 175, the cleaning liquid flow path 61A of the support base 61, and the cleaning liquid return tube 176. In this case, a part of the cleaning liquid flowing through the cleaning liquid flow path 61A is absorbed by the first sponge wiper 64 by coming into contact with the lower end portion of the first sponge wiper 64. Accordingly, the first sponge wiper 64 is in a state of being impregnated with the cleaning liquid. The first sponge wiper 64 that is impregnated with the cleaning liquid is heated by heat transferred from the cleaning liquid. The process of heating the first sponge wiper 64 with the cleaning liquid is an example of the heating process.

At the same time, the controller 130 causes the first liquid supply pump 180 to operate by driving the first liquid supply pump motor 309 in a state in which the first liquid supply valve 201 is opened. Accordingly, the liquid in the liquid tank 78 circulates between the second sponge wiper 65 and the liquid tank 78 through the first liquid supply tube 179, the liquid flow path 61B of the support base 61, and the liquid return tube 202. In this case, a part of the liquid flowing through the liquid flow path 61B is absorbed by the second sponge wiper 65 by coming into contact with the lower end portion of the second sponge wiper 65. Accordingly, the second sponge wiper 65 is in a state of being impregnated with the liquid. The second sponge wiper 65 that is impregnated with the liquid is heated by heat transferred from the liquid. The process of heating the second sponge wiper 65 with the liquid is an example of the heating process.

Next, the controller 130 causes the head 38 to move downward so as to move from the uncapped position indicated by the broken line to the wiped position indicated by the solid line in FIG. 8. In this case, the maintenance mechanism 60 is in the maintenance position indicated by the broken line in FIG. 8.

The controller 130 drives the first motor 55 to cause the gear 106 to rotate clockwise in FIG. 8. When the gear 106 rotates clockwise, the gear 105 rotates counterclockwise in FIG. 8. Accordingly, the maintenance mechanism 60 at the maintenance position moves forward (downstream in the conveying orientation 8A) along the conveying orientation 8A and reaches the wiping position (see FIG. 8).

In this case, the upper end portions of the first sponge wiper 64, the second sponge wiper 65, and the rubber wiper 63 slide in the conveying orientation 8A with respect to the nozzle surface 50 while abutting against the nozzle surface 50 of the discharge module 49. Accordingly, the nozzle surface 50 is wiped by the first sponge wiper 64, the second sponge wiper 65, and the rubber wiper 63, thereby removing a foreign matter adhering to the nozzle surface 50. In this case, bubbles of the cleaning liquid may be generated on the nozzle surface 50 by a wiping operation of the first sponge wiper 64. However, since the nozzle surface 50 is wiped by the second sponge wiper 65 that is impregnated with the liquid containing the defoaming agent immediately after being wiped by the first sponge wiper 64 (for example, within five seconds), the bubbles of the cleaning liquid generated on the nozzle surface 50 immediately disappear by coming into contact with the liquid containing the defoaming agent. Since the nozzle surface 50 is wiped by the rubber wiper 63 immediately after being wiped by the second sponge wiper 65, the cleaning liquid and the liquid remaining on the nozzle surface 50 are removed by a wiping operation of the rubber wiper 63. The conveying orientation 8A is an example of the one direction. The nozzle surface 50 is an example of the predetermined portion. The process of wiping the nozzle surface 50 by the first sponge wiper 64 is an example of a first supply process. The first supply process is an example of supplying the cleaning liquid. The process of wiping the nozzle surface 50 by the second sponge wiper 65 is an example of a second supply process. The second supply process is an example of supplying the liquid.

Next, the controller 130 drives the head motor 54 to cause the head 38 to move to the uncapped position indicated by the broken line in FIG. 8. Next, the controller 130 drives the first motor 55 to cause the gear 106 to rotate counterclockwise in FIG. 8. When the gear 106 rotates counterclockwise, the gear 105 rotates clockwise in FIG. 8. Accordingly, the maintenance mechanism 60 moves rearward (upstream in the conveying orientation 8A) and reaches the maintenance position. Next, the controller 130 causes the head 38 to move from the uncapped position to the capped position (see FIG. 7). Thus, the controller 130 ends the wiping process.

Movement of Maintenance Mechanism 60 to Retreat Position

When the wiping process is completed, the controller 130 causes the maintenance mechanism 60 to move to the retreat position. Specifically, the controller 130 first drives the shaft motor 59 to change the posture of the first support mechanism 51 from the first posture to the second posture (see FIG. 9).

Next, the controller 130 drives the first motor 55. Accordingly, as the gear 106 rotates clockwise in FIG. 9, the gear 105 rotates counterclockwise in FIG. 9. As a result, the maintenance mechanism 60 moves in the forward inclination orientation 5 and is transferred onto the second support mechanism 52.

Next, the controller 130 drives the second motor 56. Accordingly, as the gear 120 rotates clockwise, the gears 118 and 119 rotate counterclockwise. As a result, the maintenance mechanism 60 reaches the standby position on the second support mechanism 52 (see FIG. 10).

Finally, the controller 130 drives the vertical drive motor 163. Accordingly, as the screw shaft 161 of the ball screw 160 rotates, the second support mechanism 52 moves upward from the standby position along the orthogonal direction 10, and the maintenance mechanism 60 reaches the retraction position. Accordingly, the cap 62, the first sponge wiper 64, the second sponge wiper 65, and the rubber wiper 63 abut against the wiper cleaning mechanism 80.

Image Recording Process

Hereinafter, a process when an image is recorded on the sheet S (image recording process) will be described.

When the controller 130 receives a command to record an image on the sheet S from outside of the operation panel 44, an information processing device connected to the image recording device 100 via a LAN or the like, and the like, the controller 130 causes the maintenance mechanism 60 to move from the maintenance position to the retreat position as described above. The controller 130 drives the shaft motor 59 to change the posture of the first support mechanism 51 from the second posture to the first posture.

Next, the controller 130 causes the head 38 to move downward so as to move from the capped position to the recording position. Next, the controller 130 drives the conveying motor 53 to cause the holder 35, the conveying roller 36A, the conveying roller 40A, and the drive roller 102 to rotate. Accordingly, conveyance of the sheet S is started, and the sheet S reaches directly below the head 38. At the same time, the controller 130 drives the pump motors 138 and 139 in a state in which the bypass valve 189 and the cleaning liquid introduction valve 302 are closed and the purge shutoff valve 188 is opened. Accordingly, a pressure difference is generated between the discharge module 49 and the ink sub-tank 181 due to operations of the positive pressure pump 191 and the decompression pump 193. Due to this pressure difference, the ink is discharged from the plurality of nozzles 38A while circulating through the flow paths 183 and 184 between the ink sub-tank 181 and the discharge module 49. Accordingly, an image is recorded on the sheet S. The ink adhering to the sheet S is fixed to the sheet S by being heated when passing through the heater 39. After the sheet S having passed through the heater 39 is further conveyed in the conveying orientation 8A by the conveying roller pair 40, and the image recorded by the CIS 25 is checked, the sheet S is cut into a predetermined size by the cutter unit 26 and ejected from the ejection port 33.

After the image recording process on the sheet S, when the maintenance mechanism 60 moves to the maintenance position, a process reverse to that described above is executed.

Operation and Effect of Embodiment

In the maintenance method described above, even when the bubbles of the cleaning liquid containing the surfactant are generated in a predetermined portion (the waste liquid tank 77 and the nozzle surface 50) of the image recording device 100, the liquid containing the defoaming agent is supplied to the predetermined portion. Therefore, the bubbles of the cleaning liquid are removed by the defoaming agent coming into contact with the bubbles of the cleaning liquid. Therefore, a failure of the image recording device 100 due to the bubbles of the cleaning liquid can be prevented. Since the liquid of which the ratio of the defoaming distance to the foaming distance is 4.41% or more is supplied to the predetermined portion, it is possible to remove all the bubbles of the cleaning liquid from the predetermined portion by using a small amount of the liquid.

In the maintenance method described above, the defoaming agent belongs to any of the group consisting of glycol ethers, silicones, and polyhydric alcohols. Therefore, the defoaming effect of the defoaming agent removing the bubbles of the cleaning liquid is improved.

In the maintenance method described above, since the liquid contains the defoaming agent belonging to glycol ethers in a ratio of 20% or more, the defoaming effect of the defoaming agent removing the bubbles of the cleaning liquid is high.

In the maintenance method described above, since the defoaming agent belonging to glycol ethers is contained in a ratio of 30% or more, the defoaming effect of the defoaming agent removing the bubbles of the cleaning liquid is high.

In the maintenance method described above, since the liquid contains the defoaming agent belonging to polyhydric alcohols in a ratio of 6% or more, the defoaming effect of the defoaming agent removing the bubbles of the cleaning liquid is high.

In the maintenance method described above, since the liquid contains the defoaming agent belonging to polyhydric alcohols in a ratio of 10% or more, the defoaming effect of the defoaming agent removing the bubbles of the cleaning liquid is higher.

In the maintenance method described above, since the defoaming distance is equal to the foaming distance, a ratio of removing the bubbles of the cleaning liquid generated in the standard bottle is 100%. Therefore, the defoaming effect of the defoaming agent removing the bubbles of the cleaning liquid is higher. Therefore, even when bubbles of the cleaning liquid are generated at the predetermined portion of the image recording device 100, all the bubbles are easily removed by supplying the liquid to the predetermined portion.

In the maintenance method described above, since the first sponge wiper 64 that is impregnated with the cleaning liquid wipes the nozzle surface 50, the foreign matter adhering to the nozzle surface 50 is easily removed. On the other hand, the bubbles of the cleaning liquid may be generated on the nozzle surface 50 by the operation of the first sponge wiper 64 wiping the nozzle surface 50. In this case, when a state in which the bubbles are generated continues for a long time, the bubbles enter the plurality of nozzles 38A, and thus there is a high possibility of causing a discharge failure. Therefore, it is preferable that the bubbles of the cleaning liquid generated on the nozzle surface 50 due to the wiping operation of the first sponge wiper 64 are removed as quickly as possible. In the maintenance method described above, since the second sponge wiper 65 that is impregnated with the liquid containing the defoaming agent wipes the nozzle surface 50 immediately after the nozzle surface 50 is wiped by the first sponge wiper 64, specifically, within five seconds, the defoaming agent in the liquid comes into contact with the bubbles of the cleaning liquid, and thus the bubbles on the nozzle surface 50 are immediately removed.

In the maintenance method described above, before the nozzle surface 50 is wiped by the first sponge wiper 64, the cleaning liquid absorbed by the first sponge wiper 64 and the liquid absorbed by the second sponge wiper 65 are heated. Therefore, when the liquid containing the defoaming agent and the bubbles of the cleaning liquid are brought into contact with each other, surface viscosity of the bubbles is low because a temperature of the bubbles of the cleaning liquid is high. Therefore, drainage from a film of the bubbles is promoted, or permeability of a gas with respect to the film of the bubbles increases, so that stability of the bubbles is reduced and the bubbles are easily broken. Therefore, the defoaming effect of the defoaming agent removing the bubbles of the cleaning liquid is high.

In the maintenance method described above, the first sponge wiper 64 and the second sponge wiper 65 move in the orientation of the airflow A flowing along the nozzle surface 50. Therefore, after the nozzle surface 50 is wiped by the first sponge wiper 64 and the second sponge wiper 65, the cleaning liquid and the defoaming agent remaining at an end of the nozzle surface 50 are prevented from returning toward the center of the nozzle surface 50 due to the airflow A.

In the maintenance method described above, the airflow A flowing along the nozzle surface 50 is generated by the exhaust fan 147 located at an interval from the nozzle surface 50 in the conveying orientation 8A. Therefore, the cleaning liquid and the defoaming agent remaining at the end of the nozzle surface 50 in the conveying orientation 8A are prevented from returning toward the center of the nozzle surface 50 due to the airflow A.

In the maintenance method described above, when the cleaning liquid is ejected into the waste liquid tank 77, the bubbles of the cleaning liquid may be generated in the waste liquid tank 77. Therefore, when the bubbles of the cleaning liquid increase in the waste liquid tank 77, the detection accuracy of the liquid level sensor 308 is reduced. However, after the cleaning liquid is ejected into the waste liquid tank 77, since atomized liquid containing the defoaming agent is sprayed from the liquid spray device 203, the bubbles of the cleaning liquid in the waste liquid tank 77 are easily removed. Since the liquid containing the defoaming agent of which the ratio of the defoaming distance to the foaming distance is 4.41% or more is sprayed, the bubbles of the cleaning liquid in the waste liquid tank 77 can be entirely removed even when an amount of the sprayed liquid is small. Therefore, the waste liquid tank 77 is prevented from being filled up immediately.

In the image recording device 100, when the maintenance mechanism 60 moves along the conveying orientation 8A, first, the first sponge wiper 64 that is impregnated with the cleaning liquid containing the surfactant abuts against the nozzle surface 50, so that the foreign matter adhering to the nozzle surface 50 is easily removed. In this case, even when the bubbles of the cleaning liquid are generated on the nozzle surface 50, since the second sponge wiper 65 that is impregnated with the liquid containing the defoaming agent subsequently abuts against the nozzle surface 50, the defoaming agent comes into contact with the bubbles of the cleaning liquid. Therefore, since the bubbles of the cleaning liquid are removed by the defoaming agent, the bubbles of the cleaning liquid are prevented from entering the plurality of nozzles 38A. Since the first sponge wiper 64 and the second sponge wiper 65 are used, the second sponge wiper 65 can be easily impregnated with the liquid containing the defoaming agent in an amount equal to a liquid amount of the cleaning liquid impregnating the first sponge wiper 64. Since the liquid of which the ratio of the defoaming distance to the foaming distance is 4.41% or more is supplied to the nozzle surface 50, all the bubbles of the cleaning liquid can be removed even when a liquid amount of the liquid is equal to or less than the liquid amount of the cleaning liquid. In other words, when a defoaming ratio is 4.41% or more, all the bubbles of the cleaning liquid can be removed even when the amount of the liquid containing the defoaming agent is small.

Modification

In the maintenance method described above, a liquid having a defoaming distance equal to the foaming distance is used, but a liquid having a ratio of the defoaming distance to the foaming distance of 20% or more may be used.

In the maintenance method described above, the defoaming agent belongs to any of the group consisting of glycol ethers, silicones, and polyhydric alcohols, but the defoaming agent is not limited to those belonging to the group as long as the ratio of the defoaming distance to the foaming distance is 20% or more.

In the maintenance method described above, before the nozzle surface 50 is wiped by the first sponge wiper 64 and the second sponge wiper 65, the cleaning liquid absorbed by the first sponge wiper 64 is heated by the cleaning liquid heating heater 303, and the liquid containing the defoaming agent absorbed by the second sponge wiper 65 is heated by the liquid heating heater 192, but only the liquid containing the defoaming agent may be heated or only the cleaning liquid may be heated. The reason is that, even in a case where only the liquid containing the defoaming agent is heated, heat is transferred from the liquid containing the defoaming agent to the bubbles of the cleaning liquid when the liquid containing the defoaming agent and the bubbles of the cleaning liquid are brought into contact with each other, so that the temperature of the bubbles of the cleaning liquid increases and the stability of the bubbles is reduced. In this case, one of the cleaning liquid heating heater 303 and the liquid heating heater 192 may be omitted. In addition, both the liquid containing the defoaming agent and the cleaning liquid may not be heated. The reason is that, the defoaming effect of the defoaming agent can be ensured as long as the defoaming agent has an ability to sufficiently destabilize the surface of the bubbles of the cleaning liquid. In this case, both the cleaning liquid heating heater 303 and the liquid heating heater 192 may be omitted.

In the maintenance method described above, the cleaning liquid heating heater 303 that heats the cleaning liquid stored in the cleaning liquid tank 76 is installed in the cleaning liquid tank 76, but a first wiper heating heater that heats the first sponge wiper 64 may be installed instead of the cleaning liquid heating heater 303. In this case, for example, the first wiper heating heater may be installed in the first sponge wiper 64, or may be installed in the first holding fixture that holds the first sponge wiper 64. In this manner, since the cleaning liquid impregnating the first sponge wiper 64 is heated by the heat transferred from the first sponge wiper 64, when the defoaming agent comes into contact with the bubbles of the cleaning liquid, the defoaming effect of the defoaming agent removing the bubbles of the cleaning liquid is improved.

In the maintenance method described above, the liquid heating heater 192 that heats the liquid stored in the liquid tank 78 is installed in the liquid tank 78, but a second wiper heating heater that heats the second sponge wiper 65 may be installed instead of the liquid heating heater 192. In this case, for example, the second wiper heating heater may be installed in the second sponge wiper 65, or may be installed in the second holding fixture that holds the second sponge wiper 65. In this manner, since the liquid impregnating the second sponge wiper 65 is heated by the heat transferred from the second sponge wiper 65, when the defoaming agent comes into contact with the bubbles of the cleaning liquid, the defoaming effect of the defoaming agent removing the bubbles of the cleaning liquid is improved.

In the maintenance method described above, the first sponge wiper 64 and the second sponge wiper 65 move in the orientation of the airflow A flowing along the nozzle surface 50 (the conveying orientation 8A), but may not move in the orientation of the airflow A flowing along the nozzle surface 50.

In the image recording device 100, the first sponge wiper 64 and the second sponge wiper 65 wipe the nozzle surface 50 by moving with respect to the head 38, but the nozzle surface 50 may be wiped by the first sponge wiper 64 and the second sponge wiper 65 by moving the head 38 with respect to the first sponge wiper 64 and the second sponge wiper 65.

EXAMPLES

Hereinafter, examples of the present disclosure will be described.

Example 1

A cleaning liquid was used which contains 1.0% by weight of NEOPELEX G-15 manufactured by Kao Chemical Co., Ltd. as a surfactant, 0.15% by weight of Proxel GXL manufactured by Lonza Japan Ltd. as a preservative, and water as a solvent. Water is the balance.

A liquid was used which contains 0.1% by weight of SURFYNOL (registered trademark) DF-58 manufactured by Nissin Chemical Industry Co., Ltd. as a defoaming agent and water as a solvent. Water is the balance.

Example 2

A cleaning liquid was used which contains 1.0% by weight of Sunnol NL-1430 manufactured by Lion Specialty Chemicals Co., Ltd. as a surfactant, 0.15% by weight of Proxel GXL manufactured by Lonza Japan Ltd. as a preservative, and water as a solvent. Water is the balance. The liquid had the same composition as that of Example 1.

Example 3

A cleaning liquid was used which contains 85.0% by weight of glycerin as an organic solvent, 1.0% by weight of NEOPELEX G-15 manufactured by Kao Chemical Co., Ltd. as a surfactant, 0.15% by weight of Proxel GXL manufactured by Lonza Japan Ltd. as a preservative, and water as a solvent. Water is the balance. The liquid had the same composition as that of Example 1.

Example 4

The cleaning liquid had the same composition as that of Example 3 except that 1.0% by weight of Sunnol NL-1430 manufactured by Lion Specialty Chemicals Co., Ltd. was used as a surfactant. The liquid had the same composition as that of Example 1.

Example 5

The cleaning liquid had the same composition as that of Example 3. A liquid was used which contains 0.1% by weight of BYK-093 manufactured by BYK Japan KK as a defoaming agent and water as a solvent. Water is the balance.

Example 6

The cleaning liquid had the same composition as that of Example 4. The liquid had the same composition as that of Example 5.

Example 7

The cleaning liquid had the same composition as that of Example 3. A liquid was used which contains 0.1% by weight of BYK-024 manufactured by BYK Japan KK as a defoaming agent and water as a solvent. Water is the balance.

Example 8

The cleaning liquid had the same composition as that of Example 4. The liquid had the same composition as that of Example 7.

Example 9

The cleaning liquid had the same composition as that of Example 3. A liquid was used which contains 3.0% by weight of 1,2-hexanediol (1,2-HDL) as a defoaming agent and water as a solvent.

Example 10

The cleaning liquid had the same composition as that of Example 4. The liquid had the same composition as that of Example 9.

Example 11

The cleaning liquid had the same composition as that of Example 3. A liquid was used which contains 6.0% by weight of 1,2-hexanediol (1,2-HDL) as a defoaming agent and water as a solvent. Water is the balance.

Example 12

The cleaning liquid had the same composition as that of Example 4. The liquid had the same composition as that of Example 11.

Example 13

The cleaning liquid had the same composition as that of Example 3. A liquid was used which contains 10.0% by weight of 1,2-hexanediol (1,2-HDL) as a defoaming agent and water as a solvent. Water is the balance.

Example 14

The cleaning liquid had the same composition as that of Example 4. The liquid had the same composition as that of Example 13.

Example 15

The cleaning liquid had the same composition as that of Example 4. A liquid was used which contains 6.0% by weight of triethylene glycol monobutyl ether (BTG) as a defoaming agent and water as a solvent. Water is the balance.

Example 16

The cleaning liquid had the same composition as that of Example 3. A liquid was used which contains 10.0% by weight of triethylene glycol monobutyl ether (BTG) as a defoaming agent and water as a solvent.

Example 17

The cleaning liquid had the same composition as that of Example 4. The liquid had the same composition as that of Example 16.

Example 18

The cleaning liquid had the same composition as that of Example 3. A liquid was used which contains 20.0% by weight of triethylene glycol monobutyl ether (BTG) as a defoaming agent and water as a solvent. Water is the balance.

Example 19

The cleaning liquid had the same composition as that of Example 4. The liquid had the same composition as that of Example 18.

Example 20

The cleaning liquid had the same composition as that of Example 3. A liquid was used which contains 30.0% by weight of triethylene glycol monobutyl ether (BTG) as a defoaming agent and water as a solvent. Water is the balance.

Example 21

The cleaning liquid had the same composition as that of Example 4. The liquid had the same composition as that of Example 20.

Example 22

The cleaning liquid had the same composition as that of Example 3. A liquid was used which contains 10.0% by weight of dipropylene glycol monopropyl ether (PFDG) as a defoaming agent and water as a solvent. Water is the balance.

Example 23

The cleaning liquid had the same composition as that of Example 4. The liquid had the same composition as that of Example 22.

Example 24

The cleaning liquid had the same composition as that of Example 3. A liquid was used which contains 20.0% by weight of dipropylene glycol monopropyl ether (PFDG) as a defoaming agent and water as a solvent. Water is the balance.

Example 25

The cleaning liquid had the same composition as that of Example 4. The liquid had the same composition as that of Example 24.

Example 26

The cleaning liquid had the same composition as that of Example 3. A liquid was used which contains 30.0% by weight of dipropylene glycol monopropyl ether (PFDG) as a defoaming agent and water as a solvent. Water is the balance.

Example 27

The cleaning liquid had the same composition as that of Example 4. The liquid had the same composition as that of Example 26.

Comparative Example 1

The cleaning liquid had the same composition as that of Example 3. A liquid was used which contains 0.01% by weight of Silface SAG002 manufactured by Nissin Chemical Industry Co., Ltd. as a surfactant and water as a solvent. Water is the balance.

Comparative Example 2

The cleaning liquid had the same composition as that of Example 4. The liquid had the same composition as that of Comparative Example 1.

Comparative Example 3

The cleaning liquid had the same composition as that of Example 3. A liquid was used which contains 3.0% by weight of triethylene glycol monobutyl ether (BTG) as a defoaming agent and water as a solvent. Water is the balance.

Comparative Example 4

The cleaning liquid had the same composition as that of Example 3. A liquid was used which contains 6.0% by weight of triethylene glycol monobutyl ether (BTG) as a defoaming agent and water as a solvent. Water is the balance.

Defoaming Test

The cleaning liquid is dropped into a standard bottle No. 5 with a pipette so as to have a height of 20 mm, and a stirrer is inserted into the standard bottle No. 5 and a lid is covered thereon. That is, 22.68 ml of the cleaning liquid is dropped into the standard bottle No. 5 with the pipette, and the stirrer is inserted into the standard bottle No. 5 and the lid is covered thereon. Then, the cleaning liquid in the standard bottle No. 5 is stirred for 1 minute by the stirrer. A height (first height) of bubbles of the cleaning liquid generated in the standard bottle No. 5 is measured with a ruler. The height (first height) of the bubbles is a length along the up-down direction 7 between a portion where an interface between the cleaning liquid and the bubbles is the lowest and a portion where the bubbles are the highest. A measured value was defined as a foaming distance. As the stirrer, a regular stirrer (model number: C7×20) manufactured by AS ONE CORPORATION was used. Thereafter, a liquid containing 1 ml of a defoaming agent was dropped by a pipette while being evenly conveyed through an inner wall surface of the standard bottle No. 5, and a height (second height) of the bubbles of the cleaning liquid in the standard bottle No. 5 was measured by a ruler. The height (second height) of the bubbles is a length along the up-down direction 7 between a portion where an interface between the cleaning liquid and the bubbles is the lowest and a portion where the bubbles are the highest. Then, a value obtained by subtracting the second height from the first height was set as a defoaming distance. A defoaming effect of the liquid removing the bubbles of the cleaning liquid was determined based on a liquid amount X (ml) of the liquid containing the defoaming agent necessary for removing 100% of the bubbles of the cleaning liquid in the defoaming test. S: $X \leq 1.10$ ml, A: 1.10 ml$<X\leq$1.43 ml, B: 1.43 ml$<X\leq$2.50 ml, C: 2.50 ml$<X\leq$22.68 ml, D: 22.68 ml$<X$ The liquid amount X (ml) of the liquid containing the defoaming agent is a value obtained by multiplying a ratio of a defoaming ratio Y obtained from the defoaming test to a defoaming ratio of 100% by 1 (ml) which is an actual drop amount of the liquid. That is, the liquid amount X (ml) of the liquid containing the defoaming agent is calculated by the following formula 1. The defoaming ratio is a ratio of the defoaming distance to the foaming distance.

$$X = 100/Y \times 1 \quad \text{[Formula 1]}$$

Results of Defoaming Test

As shown in Tables 1 to 4, in Examples 1 to 27, an evaluation was C or higher, and all the bubbles of the cleaning liquid could be removed by the liquid containing the defoaming agent having a smaller liquid amount than the liquid amount of the cleaning liquid, whereas in Comparative Examples 1 to 4, the evaluation was D, and the defoaming ratio obtained from the defoaming test was 0%, indicating that the bubbles in the cleaning liquid could not be completely removed. That is, it is understood that the defoaming effects of Examples 1 to 27 are excellent. It is considered that the reason why the evaluation was D in Comparative Examples 1 and 2 is that no defoaming agent was contained in the liquid. It is considered that the reason why the evaluation was D in Comparative Example 3 is that the weight % of the defoaming agent was smaller than those in Examples 15 to 21.

In addition, in a case where it is assumed that the liquid amount of the liquid containing the defoaming agent is temporarily equal to or less than the liquid amount of the cleaning liquid, that is, in a case where the value of X is 22.68 ml or less in the above-mentioned formula 1, it is understood that when the defoaming ratio is 4.41% or more, all the bubbles of the cleaning liquid can be removed even when the liquid amount of the liquid containing the defoaming agent is equal to or less than the liquid amount of the cleaning liquid. In other words, when a defoaming ratio is 4.41% or more, all the bubbles of the cleaning liquid can be removed even when the amount of the liquid containing the defoaming agent is small.

In Examples 18 to 21 and 24 to 27, the evaluation was B or higher, whereas in Examples 15 to 17, 22, and 23, the evaluation was C, and it is understood that the defoaming effects of Examples 18 to 21 and 24 to 27 are excellent. It is considered that the reason is that, in Examples 18 to 21 and 24 to 27, the defoaming agent belonging to glycol ethers was contained in an amount of 20% by weight or more, of which the weight % of the defoaming agent is larger than that of Examples 15 to 17, 22, and 23.

In Examples 20 and 21, the evaluation was A, whereas in Examples 18 and 19, the evaluation was B, and it is understood that the defoaming effects of Examples 20 and 21 are excellent. It is considered that the reason is that, in Examples 20 and 21, triethylene glycol monobutyl ether (BTG) was contained as the defoaming agent in an amount of 30.0% by weight, which is larger than the weight % of the defoaming agents in Examples 18 and 19.

In Examples 26 and 27, the evaluation was S, whereas in Examples 24 and 25, the evaluation was A, and it is understood that the defoaming effects of Examples 26 and 27 are excellent. It is considered that the reason is that, in Examples 26 and 27, dipropylene glycol monopropyl ether (PFDG) was contained as the defoaming agent in an amount of 30.0% by weight, which is larger than the weight % of the defoaming agents in Examples 24 and 25.

In Examples 11 to 14, the evaluation was B or higher, whereas in Examples 9 and 10, the evaluation was C, and it is understood that the defoaming effects of Examples 11 to 14 are excellent. It is considered that the reason is that, in Examples 11 to 14, the defoaming agent belonging to polyhydric alcohols was contained in an amount of 6.0% by weight or more, which is larger than the weight % of the defoaming agents in Examples 9 and 10.

In Examples 13 and 14, the evaluation was S, whereas in Examples 11 and 12, the evaluation was B, and it is understood that the defoaming effects of Examples 13 and 14 are excellent. It is considered that the reason is that, in Examples 13 and 14, the defoaming agent belonging to polyhydric alcohols was contained in an amount of 10.0% by weight, which is larger than the weight % of the defoaming agents in Examples 11 and 12.

TABLE 1

| | Contained component | | Example 1 | Example 2 | Example 3 | Example 4 | Example 5 | Example 6 | Example 7 | Example 8 |
|---|---|---|---|---|---|---|---|---|---|---|
| Cleaning liquid | Organic solvent | Glycerin | | | 85.0 | 85.0 | 85.0 | 85.0 | 85.0 | 85.0 |
| | | 1,2-HDL | | | | | | | | |
| | | PFDG | | | | | | | | |
| | Surfactant | NEOPELEX G-15 | 1.0 | | 1.0 | | 1.0 | | 1.0 | |
| | | Sunnol NL-1430 | | 1.0 | | 1.0 | | 1.0 | | 1.0 |
| | Preservative | Proxel GXL | 0.15 | 0.15 | 0.15 | 0.15 | 0.15 | 0.15 | 0.15 | 0.15 |
| | Solvent | Water | Balance | Balance | Balance | Balance | Balance | Balance | Balance | Balance |
| Liquid | Defoaming agent (silicones) | surfynol DF-58 | 0.1 | 0.1 | 0.1 | 0.1 | | | | |
| | | BYK-093 | | | | | 0.1 | 0.1 | | |
| | | BYK-024 | | | | | | | 0.1 | 0.1 |
| | Defoaming agent (polyhydric alcohols) | 1,2-HDL | | | | | | | | |
| | Defoaming agent (glycol ethers) | BTG | | | | | | | | |
| | | PFDG | | | | | | | | |
| | Surfactant | Silface SAG002 | | | | | | | | |
| | Solvent | Water | Balance | Balance | Balance | Balance | Balance | Balance | Balance | Balance |
| | Foaming distance (mm) | | 12 | 15 | 8 | 5 | 7 | 6 | 8 | 6 |
| | Defoaming distance (mm) | | 9 | 12 | 8 | 5 | 5 | 4 | 5 | 3 |
| | Liquid amount of liquid (ml) | | 1.33 | 1.25 | 1.00 or less | 1.00 or less | 1.40 | 1.50 | 1.60 | 2.00 |
| | Defoaming ratio (%) | | 75 | 80 | 100 | 100 | 71 | 67 | 63 | 50 |
| Evaluation | Defoaming effect | | A | A | S | S | A | B | B | B |

TABLE 2

| | Contained component | | Example 9 | Example 10 | Example 11 | Example 12 | Example 13 | Example 14 | Example 15 | Example 16 |
|---|---|---|---|---|---|---|---|---|---|---|
| Cleaning liquid | Organic solvent | Glycerin | 85.0 | 85.0 | 85.0 | 85.0 | 85.0 | 85.0 | 85.0 | 85.0 |
| | | 1,2-HDL | | | | | | | | |
| | | PFDG | | | | | | | | |
| | Surfactant | NEOPELEX G-15 | 1.0 | | 1.0 | | 1.0 | | | 1.0 |
| | | Sunnol NL-1430 | | 1.0 | | 1.0 | | 1.0 | 1.0 | |
| | Preservative | Proxel GXL | 0.15 | 0.15 | 0.15 | 0.15 | 0.15 | 0.15 | 0.15 | 0.15 |
| | Solvent | Water | Balance | Balance | Balance | Balance | Balance | Balance | Balance | Balance |
| Liquid | Defoaming agent (silicones) | surfynol DF-58 | | | | | | | | |
| | | BYK-093 | | | | | | | | |
| | | BYK-024 | | | | | | | | |
| | Defoaming agent (polyhydric alcohols) | 1.2-HDL | 3.0 | 3.0 | 6.0 | 6.0 | 10.0 | 10.0 | | |
| | Defoaming agent (glycol ethers) | BTG | | | | | | | 6.0 | 10.0 |
| | | PFDG | | | | | | | | |
| | Surfactant | Silface SAG002 | | | | | | | | |
| | Solvent | Water | Balance | Balance | Balance | Balance | Balance | Balance | Balance | Balance |
| | Foaming distance (mm) | | 8 | 8 | 8 | 8 | 7 | 6 | 8 | 8 |
| | Defoaming distance (mm) | | 2 | 2 | 4 | 4 | 7 | 6 | 1 | 2 |
| | Liquid amount of liquid (ml) | | 4.00 | 4.00 | 2.00 | 2.00 | 1.00 or less | 1.00 or less | 8.00 | 4.00 |
| | Defoaming ratio (%) | | 25 | 25 | 50 | 50 | 100 | 100 | 13 | 25 |
| Evaluation | Defoaming effect | | C | C | B | B | S | S | C | C |

TABLE 3

| | Contained component | | Example 17 | Example 18 | Example 19 | Example 20 | Example 21 | Example 22 | Example 23 | Example 24 |
|---|---|---|---|---|---|---|---|---|---|---|
| Cleaning liquid | Organic solvent | Glycerin | 85 | 85.0 | 85.0 | 85.0 | 85.0 | 85.0 | 85.0 | 85.0 |
| | | 1,2-HDL | | | | | | | | |
| | | PFDG | | | | | | | | |
| | Surfactant | NEOPELEX G-15 | | 1.0 | | 1.0 | | 1.0 | | 1.0 |
| | | Sunnol NL-1430 | 1.0 | | 1.0 | | 1.0 | | 1.0 | |
| | Preservative | Proxel GXL | 0.15 | 0.15 | 0.15 | 0.15 | 0.15 | 0.15 | 0.15 | 0.15 |
| | Solvent | Water | Balance | Balance | Balance | Balance | Balance | Balance | Balance | Balance |
| Liquid | Defoaming agent (silicones) | surfynol DF-58 | | | | | | | | |
| | | BYK-093 | | | | | | | | |
| | | BYK-024 | | | | | | | | |
| | Defoaming agent (polyhydric alcohols) | 1,2-HDL | | | | | | | | |
| | Defoaming agent (glycol ethers) | BTG | 10.0 | 20.0 | 20.0 | 30.0 | 30.0 | | | |
| | | PFDG | | | | | | 10.0 | 10.0 | 20.0 |
| | Surfactant | Silface SAG002 | | | | | | | | |
| | Solvent | Water | Balance | Balance | Balance | Balance | Balance | Balance | Balance | Balance |
| | Foaming distance (mm) | | 5 | 8 | 5 | 8 | 6 | 7 | 8 | 7 |
| | Defoaming distance (mm) | | 1 | 4 | 3 | 6 | 5 | 2 | 3 | 5 |
| | Liquid amount of liquid (ml) | | 5.00 | 2.00 | 1.67 | 1.33 | 1.20 | 3.50 | 2.67 | 1.40 |
| | Defoaming ratio (%) | | 20 | 50 | 60 | 75 | 83 | 29 | 38 | 71 |
| Evaluation | Defoaming effect | | C | B | B | A | A | C | C | A |

TABLE 4

| | Contained component | | Example 25 | Example 26 | Example 27 | Comparative Example 1 | Comparative Example 2 | Comparative Example 3 | Comparative Example 4 |
|---|---|---|---|---|---|---|---|---|---|
| Cleaning liquid | Organic solvent | Glycerin | 85 | 85.0 | 85.0 | 85.0 | 85.0 | 85.0 | 85.0 |
| | | 1.2-HDL | | | | | | | |
| | | PFDG | | | | | | | |
| | Surfactant | NEOPELEX G-15 | | 1.0 | | 1.0 | | 1.0 | 1.0 |
| | | Sunnol NL-1430 | 1 | | 1.0 | | 1.0 | | |
| | Preservative | Proxel GXL | 0.15 | 0.15 | 0.15 | 0.15 | 0.15 | 0.15 | 0.15 |
| | Solvent | Water | Balance | Balance | Balance | Balance | Balance | Balance | Balance |
| Liquid | Defoaming agent (silicones) | surfynol DF-58 | | | | | | | |
| | | BYK-093 | | | | | | | |

TABLE 4-continued

| | Contained component | | Example 25 | Example 26 | Example 27 | Comparative Example 1 | Comparative Example 2 | Comparative Example 3 | Comparative Example 4 |
|---|---|---|---|---|---|---|---|---|---|
| | | BYK-024 | | | | | | | |
| | Defoaming agent (polyhydric alcohols) | 1,2-HDL | | | | | | | |
| | Defoaming agent (glycol ethers) | BTG | | | | | | 3.0 | 6.0 |
| | | PFDG | 20 | 30.0 | 30.0 | | | | |
| | Surfactant | Silface SAG002 | | | | 0.01 | 0.01 | | |
| | Solvent | Water | Balance | Balance | Balance | Balance | Balance | Balance | Balance |
| | Foaming distance (mm) | | 8 | 7 | 8 | 8 | 5 | 8 | 8 |
| | Defoaming distance (mm) | | 6 | 7 | 8 | 0 | 0 | 0 | 0 |
| | Liquid amount of liquid (ml) | | 1.33 | 1.00 or less | 1.00 or less | | | | |
| | Defoaming ratio (%) | | 75 | 100 | 100 | 0 | 0 | 0 | 0 |
| Evaluation | Defoaming effect | | A | S | S | D | D | D | D |

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A maintenance method, comprising:

supplying a cleaning liquid containing a surfactant to a predetermined portion of an inkjet printer; and supplying a defoaming liquid containing a defoaming agent to the predetermined portion to which the cleaning liquid is supplied, wherein the defoaming liquid has a ratio of a defoaming distance to a foaming distance of 4.41% or more, the foaming distance is a first height of bubbles generated when the cleaning liquid is stirred by a stirrer for 1 minute, the cleaning liquid being put into a bottle having an inner diameter of 38 mm and a capacity of 50 ml so as to have a height of 20 mm, and the defoaming distance is a value obtained by subtracting, from the first height of the bubbles, a second height of bubbles after 1 ml of the defoaming liquid is dropped into the bottle after the bubbles are generated.

2. The maintenance method according to claim 1, wherein the defoaming agent is any of the group consisting of glycol ethers, silicones, and polyhydric alcohols.

3. The maintenance method according to claim 2, wherein the defoaming liquid contains the defoaming agent of glycol ethers in a ratio of 20% or more to a total amount of the defoaming liquid.

4. The maintenance method according to claim 2, wherein the defoaming liquid contains the defoaming agent of glycol ethers in a ratio of 30% or more to a total amount of the defoaming liquid.

5. The maintenance method according to claim 4, wherein the defoaming distance is equal to the foaming distance.

6. The maintenance method according to claim 2, wherein the defoaming liquid contains the defoaming agent of polyhydric alcohols in a ratio of 6% or more to a total amount of the defoaming liquid.

7. The maintenance method according to claim 2, wherein the defoaming liquid contains the defoaming agent belonging to polyhydric alcohols in a ratio of 10% or more to a total amount of the defoaming liquid.

8. The maintenance method according to claim 7, wherein the defoaming distance is equal to the foaming distance.

9. The maintenance method according to claim 1, wherein the predetermined portion is a nozzle surface on which a plurality of nozzles are opened, in the supplying the cleaning liquid, the nozzle is wiped by a first wiper that is impregnated with the cleaning liquid, and in the supplying the defoaming liquid, the nozzle surface is wiped by a second wiper that is impregnated with the defoaming liquid within five seconds after the first wiper wipes the nozzle surface.

10. The maintenance method according to claim 9, further comprising:

heating at least one of the first wiper and the second wiper before the supplying the cleaning liquid.

11. The maintenance method according to claim 10, wherein in the supplying the cleaning liquid, the nozzle surface is wiped by moving the first wiper in an orientation of an airflow flowing along the nozzle surface, and in the supplying the defoaming liquid, the nozzle surface is wiped by moving the second wiper in the orientation of the airflow flowing along the nozzle surface.

12. The maintenance method according to claim 11, wherein the airflow is caused to flow along one direction by a fan located at an interval from the nozzle surface in the one direction, and the first wiper and the second wiper are moved along the one direction in the supplying the cleaning liquid.

13. The maintenance method according to claim 1, wherein the predetermined portion is a waste liquid tank from which the cleaning liquid is ejected, the cleaning liquid is ejected into the waste liquid tank in the supplying the cleaning liquid, and the defoaming liquid is sprayed toward the cleaning liquid in the waste liquid tank from above in the supplying the defoaming liquid.

14. An image recording device, comprising:

a first wiper that is impregnated with a cleaning liquid containing a surfactant, a second wiper that is impregnated with a defoaming liquid containing a defoaming agent, a support body configured to support the first wiper and the second wiper, a head including a nozzle surface on which a plurality of nozzles are opened, and a moving mechanism configured to cause the head and the support body to relatively move along a first direction, wherein the second wiper is located upstream of the first wiper in a moving direction of the support body, the first wiper and the second wiper abut against the nozzle surface when the support body moves along the first direction, the defoaming liquid has a ratio of a defoaming distance to a foaming distance of 4.41% or more, the foaming distance is a first height of bubbles generated when the cleaning liquid is stirred by a stirrer for 1 minute, the cleaning liquid being put into a bottle having an inner diameter of 38 mm and a capacity of 50 ml so as to have a height of 20 mm, and the defoaming distance is a value obtained by subtracting, from the first height of the bubbles, a second height of bubbles after 1 ml of the defoaming agent is dropped into the bottle after the bubbles are generated.

* * * * *